United States Patent
Steinmacher-Burow

(10) Patent No.: US 11,119,927 B2
(45) Date of Patent: Sep. 14, 2021

(54) COORDINATION OF CACHE MEMORY OPERATIONS

(71) Applicant: International Business Machines Corporation, Armonk, NY (US)

(72) Inventor: Burkhard Steinmacher-Burow, Esslingen Am Neckar (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 15/944,047

(22) Filed: Apr. 3, 2018

(65) Prior Publication Data

US 2019/0303295 A1    Oct. 3, 2019

(51) Int. Cl.
*G06F 12/0817* (2016.01)
*G06F 12/084* (2016.01)
(Continued)

(52) U.S. Cl.
CPC .......... *G06F 12/0828* (2013.01); *G06F 9/522* (2013.01); *G06F 9/544* (2013.01);
(Continued)

(58) Field of Classification Search
CPC ...... G06F 9/522; G06F 9/544; G06F 12/0808; G06F 12/0817; G06F 12/0822;
(Continued)

(56) References Cited

U.S. PATENT DOCUMENTS 5,848,283 A * 12/1998 Moore ................ G06F 12/0831
                                                712/40
6,070,231 A *  5/2000 Ottinger .............. G06F 12/0828
                                                711/141
(Continued)

FOREIGN PATENT DOCUMENTS

GB    2539383 B    8/2017
WO  2019193455 A1  10/2019

OTHER PUBLICATIONS

ARM Limited, *ARM Cortex™ -M Programming Guide to Memory Barrier Instructions Application Note* 321, Sep. 2012, 52 pages, ARM Limited (online), <https://static.docs.arm.com/dai0321/a/DAI0321A_programming_guide_memory_barriers_for_m_profile.pdf>.

(Continued)

*Primary Examiner* — Gary W. Cygiel
(74) *Attorney, Agent, or Firm* — David M. Quinn

(57) ABSTRACT

The invention relates to a method for coordinating an execution of an instruction sequence by a processor device of a coherent shared memory system. An instruction is executed and causes the processor device to fill a copy of a memory line to a processor cache memory. The memory line is flagged by the processor device upon detection of first flag information which indicates that propagation of memory coherence across the shared memory system in respect of the memory line is unconfirmed. The memory line is unflagged by the processor device upon detection of second flag information which indicates that the propagation of memory (Continued)

coherence in respect of the memory line is confirmed. Upon execution of a memory barrier instruction, a completion of execution of the memory barrier instruction is prevented while the memory line is flagged.

24 Claims, 12 Drawing Sheets

(51) Int. Cl.
  *G06F 12/0831* (2016.01)
  *G06F 9/52* (2006.01)
  *G06F 9/54* (2006.01)
  *G06F 12/0808* (2016.01)

(52) U.S. Cl.
  CPC ........ *G06F 12/084* (2013.01); *G06F 12/0808* (2013.01); *G06F 12/0822* (2013.01); *G06F 12/0833* (2013.01); *G06F 2212/1048* (2013.01); *G06F 2212/621* (2013.01)

(58) Field of Classification Search
  CPC .............. G06F 12/0828; G06F 12/084; G06F 12/0833; G06F 2212/621; G06F 2212/1048
  See application file for complete search history.

(56) References Cited

U.S. PATENT DOCUMENTS

| | | | |
|---|---|---|---|
| 6,088,769 A * | 7/2000 | Luick | G06F 12/0826 711/118 |
| 6,356,983 B1 * | 3/2002 | Parks | G06F 12/0817 711/145 |
| 6,963,967 B1 | 11/2005 | Guthrie et al. | |
| 8,095,739 B2 | 1/2012 | Cummings et al. | |
| 8,281,079 B2 * | 10/2012 | Steely, Jr. | G06F 12/0815 711/144 |
| 9,652,400 B2 | 5/2017 | Hooker et al. | |
| 2005/0154863 A1 | 7/2005 | Steely et al. | |
| 2005/0160430 A1 | 7/2005 | Steely et al. | |
| 2009/0248988 A1 * | 10/2009 | Berg | G06F 12/0835 711/141 |
| 2010/0318741 A1 | 12/2010 | Scott et al. | |
| 2013/0205121 A1 | 8/2013 | Guthrie et al. | |
| 2013/0227221 A1 | 8/2013 | Yu | |
| 2014/0040551 A1 | 2/2014 | Blainey et al. | |
| 2016/0179674 A1 | 6/2016 | Sury et al. | |
| 2017/0046263 A1 | 2/2017 | Solihin | |
| 2017/0083445 A1 | 3/2017 | Alexander et al. | |

OTHER PUBLICATIONS

Valsan et al., *Taming Non-Blocking Caches to Improve Isolation in Multicore Real-Time Systems*, Real-Time and Embedded Technology and Applications Symposium (RTAS), Apr. 2016, IEEE Xplore Digital Library, IEEE.org (online), <http://ieeexplore.ieee.org/stamp/stamp.jsp?tp=&arnumber=7461361&isnumber=7461311>.

Maranget et al., *A Tutorial Introduction to the ARM and POWER Relaxed Memory Models*, Course Material, Multicore Semantics and Programming, Oct. 2012, pp. 1-50, University of Cambridge (online), <https://www.cl.cam.ac.uk/~pes20/ppc-supplemental/test7.pdf>.

Wikipedia, *MESI protocol*, wikipedia.org (online), 10 pages, accessed Dec. 20, 2017, <https://en.wikipedia.org/wiki/MESI_protocol>.

Wikipedia, *MOESI protocol*, wikipedia.org (online), 3 pages, accessed Dec. 20, 2017, <https://en.wikipedia.org/wiki/MOESI_protocol>.

Wikipedia, *MSI protocol*, wikipedia.org (online), 4 pages, accessed Dec. 20, 2017, <https://en.wikipedia.org/wiki/MSI_protocol>.

Abts et al., *So Many States, So Little Time: Verifying Memory Coherence in the Cray X1*, Proceedings of the International Parallel and Distributed Processing Symposium, Apr. 2003, 10 pages, IEEE Xplore Digital Library, IEEE.org (online), <http://ieeexplore.ieee.org/document/1213087/>.

Sarkar et al., *Understanding POWER Multiprocessors*, Proceedings of the 32nd ACM SIGPLAN Conference on Programming Language Design and Implementation (PLDI'11), Jun. 2011, pp. 175-86, ACM New York, NY.

Freescale Semiconductor, *Synchronizing Instructions for PowerPC™ Instruction Set Architecture*, Application Note, Nov. 2006, 8 pages, Freescale Semiconductor, Inc. (online), <https://www.nxp.com/docs/en/application-note/AN2540.pdf>.

International Search Report and Written Opinion, PCT/IB2018/052482, Jul. 17, 2019, 15 pages.

* cited by examiner

COORDINATION OF CACHE MEMORY OPERATIONS

BACKGROUND

The present disclosure relates to the field of computer systems. More particularly, to a method for coordinating an execution of an instruction sequence comprising a plurality of instructions by a processor device of a coherent shared memory system, a processor device of a coherent shared memory system, a method for managing a coherence directory implementing memory coherence of a shared memory system, a coherence directory implementing memory coherence of a shared memory system and a coherent shared memory system comprising a coherence directory implementing memory coherence of the shared memory system.

Shared memory systems comprise a plurality of processors which are all provided memory access, thus improving the efficiency of data processing. A shared memory may provide simultaneous access to the same data for a plurality of processors, avoid storing redundant copies of data and enable data transfer between the processors. The shared memory system e.g. provides a main memory that can be accessed by the plurality of processors. In order to enable a fast access to memory lines of the main memory for the processors, a memory architecture of such a shared memory system may further comprise a plurality of processor cache memories for caching data to be processed by the processors. For example, each processor may be operatively connected with one or more processor cache memories.

However, in a shared memory system with a plurality of processor cache memories there is a risk of complications which may arise due to a lack of data coherence. Whenever data comprised by one of the processor cache memories is updated, it has to be ensured that all the remaining processor cache memories will use the updated data, when processing the same data in order to avoid that different processors use incoherent data. In other words, propagation of coherence across the shared memory system has to be ensured in order to establish coherence throughout the system.

In order to prevent that a processor uses out-of-date data, which has meanwhile been amended, an ordering constraint on memory operations is required. A strongly ordered memory model stipulates that changes to the values of shared variables always have to be visible to the other threads of a multi-threaded program executed. In other word, the ordering of the memory operations has to be defined in advance without allowing for exceptions in order to avoid race conditions. However, a strongly ordered model may be inflexible resulting in a limitation of processing efficiency. In contrast, processing efficiency may be improved by allowing for a relaxation of the strong order. There may be instructions which may be executed parallel or even in an arbitrary order without causing problems or leading to a race condition. Memory models which allow for a relaxation of the order are referred to as weakly ordered memory models. In order to still keep up some level of ordering, weakly ordered memory models specify memory barriers that are established via special, well-defined memory barrier instructions. A memory barrier instruction defines a point in an instruction sequence at which coherence has to be ensured and, if necessary, a synchronization performed. Such a weak memory model stipulates that changes to the values of shared variables only need to be made visible to other threads, when such a memory barrier is reached.

Weakly ordered memory models may provide a higher degree of freedom when optimizing an instruction sequence. It only has to be made sure that values of potentially shared variables at memory barriers are guaranteed to be the same in both the optimized and unoptimized instruction sequence. In particular, reordering statements in a block of instructions that contains no memory barrier may be assumed to be safe.

In order to ensure memory coherence of shared memory systems and improve performance, there is a continuous need to improve the implementation and managing of memory barriers.

SUMMARY

Various embodiments provide a method for coordinating an execution of an instruction sequence comprising a plurality of instructions by a processor device of a coherent shared memory system, a processor device of a coherent shared memory system, a method for managing a coherence directory implementing memory coherence of a shared memory system, a coherence directory implementing memory coherence of a shared memory system and a coherent shared memory system comprising a coherence directory implementing memory coherence of the shared memory system. Advantageous embodiments are described in the dependent claims. Embodiments of the present invention may be freely combined with each other if they are not mutually exclusive.

In one aspect, the invention relates to a method for coordinating an execution of an instruction sequence comprising a plurality of instructions by a processor device of a coherent shared memory system. The processor device is operatively connected with a processor cache memory. An instruction of the instruction sequence is executed by the processor device. The execution of the instruction causes the processor device to fill a copy of a memory line of a main memory of the shared memory system to the processor cache memory. The memory line is flagged by the processor device upon detecting first flag information indicating that propagation of memory coherence across the shared memory system in respect of the filling of the copy of the memory line is unconfirmed. The flagged memory line is unflagged by the processor device upon detecting second flag information indicating that the propagation of the memory coherence across the shared memory system in respect of the filling of the copy of the memory line is confirmed. Upon execution of a memory barrier instruction of the instruction sequence by the processor device, the processor device prevents a completion of the execution while the memory line is flagged.

Embodiments may have the beneficial effect that the processor device is enabled to efficiently ensure that the execution of the instruction sequence is stalled as soon as the memory barrier instruction is reached, i.e. executed, in case propagation of coherence has not been confirmed yet. The flagging of the memory line indicates that the propagation of memory coherence across the shared memory system in respect of the filling of the copy of the memory line is unconfirmed. In other words, the flagging indicates the no information is available whether or whether not the memory coherence across the shared memory system in respect of the filling of the copy of the memory line is established. In case the memory line is unflagged, no problems regarding the coherence are present, but the propagation of the coherence has rather been explicitly and positively confirmed and no stall is necessary. In case the memory line is flagged, it has to be waited for explicit confirmation and a stall is necessary.

Such confirmation may e.g. be provided by a directory implementing directory-based coherence of the shared memory system or by replies of the remaining processor devices of the shared memory system to a request regarding the establishment of coherence broadcasted by the processor device performing the filling of the memory line. Since only memory lines for which the propagation of coherence is unconfirmed are flagged, i.e. an indicator being registered as a flag, local memory space of the processor device may be saved.

The execution may only be continued under the condition that the memory line is unflagged, i.e. that it is confirmed that the memory coherence is propagated across the shared memory system. A propagation of the memory coherence across the shared memory system means that coherence of the shared memory system is established in respect of the filling of the copy of the memory line to the processor cache memory. The coordinating of the execution of an instruction sequence is implemented by an individual processor device, e.g. a processor chip or a processor core. Thus, the method may be usable for directory-based coherence as well as broadcast-based coherence.

According to embodiments, the completion of execution of the memory barrier instruction is prevented until all memory lines previously flagged by the processor device are unflagged. Embodiments may have the beneficial effect that the unflagging of an individual memory line is a necessary condition for the continuation of execution of the memory barrier instruction. As a sufficient condition it may be implemented that all memory lines previously flagged by the processor device are unflagged, i.e. that the processor device comprises neither flagged memory lines nor flags of memory lines. Thus, instructions causing a filling of copy of a memory line to the processor cache memory may be executed freely without taking into account memory coherence until the memory barrier instruction is reached. As soon as the memory barrier instruction is reached, memory coherence has to be established and actively confirmed for the memory barrier instruction to be continued. Memory coherence may be propagated across the shared memory system before the memory barrier instruction is executed. However, the memory barrier instruction constitutes a point in the instruction sequence at which it is demanded that the propagation of coherence across the shared memory system in respect to all the fillings of copies of memory lines to the processor cache memory must have been completed. The respective completion may be ensured by demanding an explicit confirmation of the successful propagating. Before the execution of the memory barrier, knowledge about the propagation of coherence may be established by the processor, but does not have to be established.

According to embodiments, the flagging of the memory line comprises adding an identifier of the memory line to a buffer of the processor device. The unflagging of the flagged memory line comprises removing the identifier of the memory line from the buffer of the processor. Embodiments may have the beneficial effect that the buffer may provide a direct overview, whether or not there are memory lines for which a necessary confirmation of propagation of coherence across the shared memory system is still missing. The buffer may provide the flags e.g. in form of an unordered set of indicators. In case an indicator indicating a memory line is comprised by the buffer, propagation of coherence for the respective memory line has not been confirmed yet. In case, for a specific memory line no indicator is comprised by the buffer, propagation of coherence for the respective memory line has been confirmed. Flags may be set by adding indicators indicating the memory lines to be flagged to the buffer. Thus, the buffer is a buffer of unpropagated memory lines.

According to embodiments, the completion of execution of the memory barrier instruction is prevented until the buffer of the processor device is empty. Embodiments may have the beneficial effect that they provide a fast and effective implementation of a check of coherence in case a memory buffer instruction is executed requiring a check of coherence. In case the buffer comprises no indicators, coherence has been established and confirmed for every memory line previously filled to the processor cache memory by the processor device. In case the buffer still comprises indicators, the processor device will wait until coherences for those remaining indicators is confirmed and the buffer is empty. Thus, it may be ensured that for an instruction of the instruction sequence executed subsequent to the memory barrier instruction, the shared memory system is coherent in respect of all memory lines of which copies have been filled to the processor cache memory previously.

According to embodiments, messages relating to amendments of the content of the processor cache memory and processed by the processor device comprise a coherence propagation field. The coherence propagation field comprises one of the following: flag information indicating that propagation of memory coherence across the shared memory system in respect of the amendment is unconfirmed, flag information indicating that propagation of memory coherence across the shared memory system in respect of the amendment is confirmed, or flag information indicating that neither a flagging nor an unflagging action is required.

Embodiments may have the beneficial effect of enabling an efficient communication between the processor device and the rest of the shared memory system, thereby providing feedback regarding the filling of the copy of the memory line to the processor cache memory and the propagation of coherence across the shared memory system in respect of the filling of the copy of the memory line to the processor cache memory. For example, the processor device may request an exclusive write access to a memory line of the main memory. In case of a miss of the request in the processor cache memory, a request may be sent to a coherence directory or be broadcasted across the shared memory system. The request may comprise flag information indicating that no flagging or unflagging actions are necessary. Up to now, only a request has been sent without actually initiating a filling of the memory line to the processor cache memory. A reply to the request received by the processor device may comprise a copy of the requested data, e.g. a write exclusive copy, which the receiving processor fills to the processor cache memory. The reply may comprise flag information indicating that propagation of memory coherence across the shared memory system in respect of the amendment is unconfirmed. After memory coherence across the shared memory system is established, e.g. by invalidating shared read copies of the requested memory line comprised by processor cache memories of further processor devices, the invalidations may be confirmed by the further processor devices executing the same. The confirmation may be send to the processor device which has filled the copy of the memory line to the processor cache memory comprised by a message in form of a command, commanding an unflagging of the respective memory line by providing flag information indicating that propagation of memory coherence across the shared memory system in respect of the amendment is confirmed.

In a further aspect, the invention relates to a processor device of a coherent shared memory system. The processor device is operatively connected with a processor cache memory and configured to coordinate an execution of an instruction sequence comprising a plurality of instructions. The coordination comprises an execution of an instruction of the instruction sequence. The execution of the instruction causes the processor device to fill a copy of a memory line of a main memory of the shared memory system to the processor cache memory. The coordination further comprises a flagging the respective memory line upon detecting flag information indicating that propagation of memory coherence across the shared memory system in respect of the filling of the copy of the memory line is unconfirmed. Upon detection of flag information indicating that the propagation of the memory coherence across the shared memory system in respect of the filling of the copy of the memory line is confirmed, the processor device unflags the memory line. Upon execution of a memory barrier instruction of the instruction sequence, the processor device prevents a completion of execution of the memory barrier instruction while the memory line is flagged.

Embodiments may have the beneficial effect of providing a processor device of a coherent shared memory system which is configured to efficiently implement the aforementioned method for coordinating an execution of an instruction sequence comprising a plurality of instructions.

According to embodiments, the completion of execution of the memory barrier instruction is prevented until all memory lines previously flagged by the processor device are unflagged. Embodiments may have the beneficial effect that the processor device ensures that the memory barrier instruction is prevented from completion until coherence of the shared memory system in respect of all fillings of copies of memory lines previously executed by the processor device is confirmed.

According to embodiments, the processor device comprises a buffer for registering memory lines of which copies are filled to the processor cache memory and for which propagation of memory coherence across the shared memory system in respect of the filling of the respective copies is unconfirmed. The flagging of the memory line comprises adding an identifier of the memory line to the buffer of the processor device. The unflagging of the flagged memory line comprises removing the identifier of the memory line from the buffer of the processor.

Embodiments may have the beneficial effect that an infrastructure for registering memory lines for which propagation of memory coherence across the shared memory system in respect of the filling of the respective copies is unconfirmed.

According to embodiments, the completion of execution of the memory barrier instruction is prevented until the buffer of the processor device is empty. Embodiments may have the beneficial effect that an effective overview may be provided by the buffer, whether there are any memory lines, copies of which have been filled to the processor cache memory previously to the completion of the memory barrier instruction and for which a confirmation is still required. In case the buffer is empty, all necessary confirmations have been received. In case the buffer is not empty, there are still outstanding confirmations for which the processor device has to wait.

In a further aspect, the invention relates to a method for managing a coherence directory implementing memory coherence of a shared memory system. The coherence directory maintains flag information assigned to a memory line of a main memory of the shared memory system. A processor device of the shared memory system initiates a filling of a copy of the memory line to a processor cache memory operatively connected with the processor device. The flag information indicates whether propagation of memory coherence across the shared memory system in respect of the filling of the copy of the memory line is confirmed. The coherence directory includes the flag information into a message and sends the message to the processor device.

Embodiments may have the beneficial effect of providing an efficient method for managing a coherence directory implementing memory coherence of a shared memory system. The coherence directory may check the coherence of the shared memory system and initiate actions for establishing coherence across the shared memory system, if necessary, in respect of the filling of the copy of the memory line to the processor cache memory. For example, in case an exclusive write copy and/or an amended copy of an exclusive write copy of the memory line is filled to the processor cache memory, the coherence directory may initiate an invalidation of other copies of the memory line across the shared memory system, in particular in processor cache memories of further processor devices of the shared memory system. For example, out-of-date copies, i.e. stale copies, may be invalidated in order to prevent a future use of incoherent copies of the memory lines by different processor devices of the shared memory system.

According to embodiments, the coherence directory initiates the maintaining of the flag information assigned to the memory line upon determining that an amendment of the content of a remote processor cache memory of a further processor device of the shared memory system is required in order to propagate memory coherence in respect of the filling of the copy of the memory line to the remote cache memory.

Embodiments may have the beneficial effect that processing capacities are saved and the flag information be generated and maintained only in case the coherence directory determines that the content of a remote processor cache memory of a further processor device has to be amended in order to ensure memory coherence. For example, in case of a shared read request, previously loaded shared read copies of the requested memory line in remote processor cache memories of further processor devices do not have to be amended, since memory coherence is not altered by the additional shared read request. However, in case of an exclusive write request, amendments, i.e. invalidations, of remaining shared read copies may be required in order to establish memory coherence.

According to embodiments, the coherence directory sends a request to the remote processor cache memory. The request requests an amendment of the content of the remote processor cache memory in order to propagate the memory coherence in respect of the filling of the copy of the memory line to the remote processor cache memory.

Embodiments may have the beneficial effect of implementing an efficient control of memory coherence by the coherence directory. As soon as the coherence directory has initiated and/or completed all the amendments by sending the requests and receiving the corresponding replies, the coherence directory may confirm the completion of propagation of coherence to the processor device.

According to embodiments, the coherence directory comprises a register for keeping track of the amendments of contents of the processor cache memories of the further processor devices of the shared memory system due to the propagation of the memory coherence across the shared memory system in respect of the filling of the copy of the memory line.

Embodiments may have the beneficial effect of efficiently implementing a register for tracking the amendments and determining, when the propagation of coherence is completed.

According to embodiments, the register comprises a coherence propagation notification indicator identifying processor cache memories of processor devices of the shared memory system which are to be notified by the coherence directory, when the propagation of the memory coherence across the shared memory system in respect of the filling of the copy of the memory line is confirmed.

Embodiments may have the beneficial effect of ensuring that the coherence directory is enabled to efficiently keep track of which processor cache memories of the shared memory system have to be informed about the coherence, i.e. which of the processor cache memories have been filled with copies of memory lines for which a positive check of confirmation of propagation of coherence may be required in the future, in case a memory barrier instruction is executed.

In a further aspect, the invention relates to a coherence directory implementing memory coherence of a shared memory system. The coherence directory is configured to maintain flag information assigned to a memory line of a main memory of the shared memory system. A processor device of the shared memory system initiated a filling of a copy of the memory line to a processor cache memory operatively connected with the processor device. The flag information indicates whether propagation of memory coherence across the shared memory system in respect of the filling of the copy of the memory line is confirmed. The coherence directory is further configured to include the flag information into a message and send the message to the processor device.

Embodiments may have the beneficial effect of providing a coherence directory implementing memory coherence of a shared memory system which is configured to efficiently maintaining flag information assigned to a memory line of a main memory of the shared memory system.

In a further aspect, the invention relates to a coherent shared memory system comprising a coherence directory implementing memory coherence of the shared memory system, a main memory and a processor device operatively connected with a processor cache memory.

The processor device is configured to coordinate an execution of an instruction sequence comprising a plurality of instructions. The coordination comprises an execution of an instruction of the instruction sequence. The execution of the instruction causes the processor device to fill a copy of a memory line of the main memory to the processor cache memory. Upon a detection of flag information indicating that propagation of memory coherence across the shared memory system in respect of the filling of the copy of the memory line is unconfirmed, the processor device flags the respective memory line. Upon a detection of flag information indicating that the propagation of the memory coherence across the shared memory system in respect of the filling of the copy of the memory line is confirmed, the processor device unflags the respective memory line. Upon an execution of a memory barrier instruction of the instruction sequence, the processor device prevents a completion of the execution while the memory line is flagged.

The coherence directory is configured for maintaining the flag information assigned to the memory line of the main memory upon a determination of an initiation of the filling of the copy of the memory line. The flag information indicates whether the propagation of the memory coherence across the shared memory system in respect of the filling of the copy of the memory line is confirmed. Initially the coherence directory includes the flag information indicating that the propagation of memory coherence across the shared memory system in respect of the filling of the copy of the memory line is unconfirmed into a first message and sends the first message to the processor device. The coherence directory updates the flag information upon obtaining a confirmation of the propagation and includes the updated flag information into a second message. The updated flag information indicates that the propagation of memory coherence across the shared memory system in respect of the filling of the copy of the memory line is confirmed into a second message. The second message with the updated flag information is sent to the processor device by the coherence directory.

Embodiments may have the beneficial effect of providing a coherent shared memory system comprising a coherence directory implementing memory coherence of the shared memory system, a main memory and a processor device operatively connected with a processor cache memory. The shared memory system may efficiently implement a coordination of execution of instruction sequences by individual processor devices and maintain control over the propagation of coherence across the shared memory by the coherence directory.

DETAILED DESCRIPTION

Figure 1:
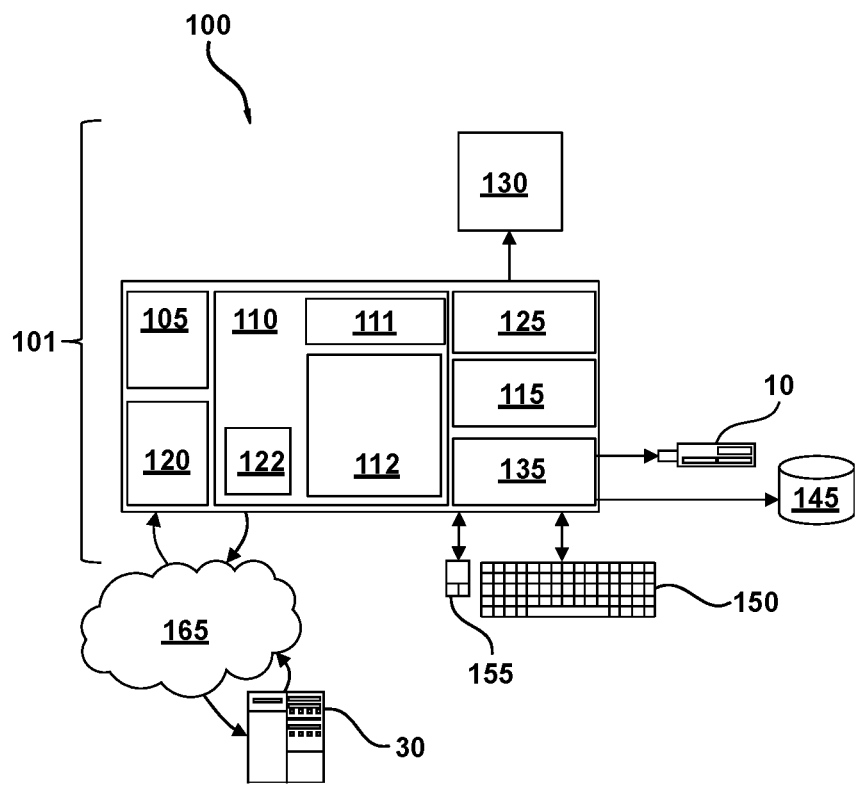
FIG. 1 depicts a schematic diagram of an exemplary computer system suited for implementing a coherent shared memory system.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A processor cache memory temporarily stores data in order to enable faster serving of future requests for that data. Data stored in a processor cache may be a copy, i.e. duplication, of data stored elsewhere, e.g. in a main memory. A cache hit occurs when the requested data can be found in a cache, while a cache miss occurs when the requested data cannot be found in the cache. Cache hits are served by reading data from the processor cache memory, which is faster than reading the data from a slower data store, like e.g. a main memory. Thus, using processor cache memories may speed up the system performs of a computer system.

In order to provide data by a processor cache memory, the data is transferred between a backing storage, like e.g. main memory, and the processor cache memory in blocks, each block of fixed size. Such a data block is referred to as a memory line or a cache line. When a memory line is copied from main memory into a processor cache memory, a cache entry is created. The cache entry may comprise the copied data, i.e. memory line, as well as the requested location in the backing storage, i.e. an address tag providing the address of the respective memory line in the main memory.

When a cache client, like e.g. a processor, needs to read from or write to a location in the backing storage, i.e. to read or write a memory line, the cache client may first check for a corresponding entry in the cache memory. The processor cache memory checks all cache entries for the address of the respective memory line. In case of a cache hit, i.e. a cache entry comprising the address tag sought is found, the processor may immediately read or write data from or to the processor cache entry with the desired address tag and thus modifying the memory line stored therein. In case of a cache miss, the processor cache memory may allocate a new cache entry and copy a memory line assigned with the sought address tag from another cache memory of another cache client, e.g. processor, or from the backing memory into the new cache entry. Then, the request may be fulfilled from the content of the new cache entry with the new memory line of the cache memory.

Caching may realize a performance increase for transfers of data, in particular of data that is being repeatedly transferred. For example, a processor cache memory may realize a performance increase upon an initial transfer of a memory line, due to buffering occurring within a cache memory. Further, a processor cache memory may realize performance increase due to retrieving a memory line from a main memory and storing the same in a faster intermediate processor cache memory such that the respective memory line in case of repeated requested may be retrieved from the faster intermediate processor cache memory rather than the main memory. In addition, a processor cache memory may realize a performance increase of writing an amended memory line by virtue of storing the memory line immediately in the intermediate processor cache memory and deferring a transfer of the respective memory line to the main memory at a later stage. Alternatively, transfer of the respective memory line to the main memory may occur as a background process.

A processor cache memory may comprise is a plurality of entries. Each entry may comprise cache data, i.e. a copy of a memory line also referred to as a cache line, which is a copy of data of a memory line, i.e. memory block, in some backing storage, like e.g. a main memory. Each entry may further comprise an address tag, which identifies the data comprised by the entry, i.e. the memory line. More precisely, the address tag may identify the data stored in the backing storage of which the respective data in the cache entry is a copy. In case of a write access to the respective cache entry, the memory line may be amended and thus represent an amended copy of some data stored in the backing storage. After amending of a memory line in the processor cache memory, the data in the in the backing storage of which the respective memory line is a copy may be updated using a memory coherence protocol in order to ensure coherence between the memory line stored in the processor cache memory and the corresponding data stored in the backing storage. In addition, each entry may comprise state information identifying a state of the data stored in the respective entry, i.e. the memory line.

In case a copy of a memory line is amended by an individual cache client, all the other copies of the memory line with the same address may become outdated. Thus, it may become necessary to manage the handling of those outdated memory lines. In order to ensure memory coherence, it may have to be ensured that no out-of-date copies of a memory line are used anymore as a valid copy. An out-of-date copy may either be invalidated or updated.

When the cache client, like e.g. a processor core or processor chip, needs to access data presumed to be stored in the backing storage, it may first check one or more processor cache memories. If an entry can be found within one of these processor cache memories with an address tag matching the address tag of the requested memory line, the memory line provided by the respective processor cache memory entry may be used instead of the corresponding data stored in the backing storage. This situation is referred to as a cache hit. In case of a cache miss, i.e. when no entry with the respective address tag of the desired memory line can be found in the one or more processor cache memories, the desired uncached data is retrieved from the backing storage. The uncached data retrieved from the backing storage during miss handling may e.g. be copied into a processor cache memory, thus enabling a cache hit in case of a further access attempt.

In order to maintain consistency between the one or processor more cache memories and the main memory, as well as between different cache memories, a caching process may have to adhere to a cache coherency protocol.

In computer architecture, memory coherence refers to a uniformity of shared resource data that is stored in a plurality of processor cache memories of a shared memory system. Maintaining memory coherence may be of particular importance in shared memory system.

In a shared memory system, e.g. in form of a shared memory multiprocessor system with at least one separate processor cache memory for each processor, it may be possible to have many copies of the same shared memory line: for example, one copy in the main memory and one in each of one or more of the local cache memories of the processors that requested a copy of the respective memory line. When one of the copies is changed, the other copies have to reflect that change. Memory coherence is the discipline which ensures that changes of copies of memory lines in the processor cache memories are propagated throughout the system in a timely fashion.

The shared memory system may comprise a plurality of processor cache memories. According to embodiments, the shared memory system may be provided in form of an electronic data processing system, like e.g. a computer. For example, the respective electronic data processing system comprises one or more multi-core processors. Each multi-core processor comprises two or more independent processing units, i.e. cores, which read and execute program instructions. Each of these cores may be provided with a local cache memory, i.e. an individual cache memory for caching data used by the respective core. According to embodiments, a local cache memory may only serve the core to which it is assigned.

According to a further example, the electronic data processing system may comprise a plurality of processor chips. Two or more of the processor chips may each comprise a local processor cache memory, i.e. an individual cache memory only serves a processor comprised by the processor chip assigned to the respective cache memory.

Memory coherence may e.g. be implemented using an invalidate-based memory coherence protocol, like e.g. MESI or modifications such as H-MESI, MOESI, MESIF or MERSI.

According to the MESI each cache entry is assigned with one of following four possible states: modified, exclusive, shared, and invalid. The state is e.g. indicated using two additional bits. "Modified" identifies a memory line which is present only in the current cache memory and which is dirty, i.e. has been amended compared with the corresponding data line stored in the main memory. Therefore, the cache memory is required to write the modified memory line back to main memory before any other read of the no longer valid data line stored in the main memory state is permitted. The write-back of the respective memory line may change the state of the memory line from modified to shared.

"Exclusive" identifies a memory line is present only in the current cache memory and which is clean, i.e. which still matches the corresponding data lines stored in main memory. The exclusive state may be changed to shared state e.g. in response to receiving a read request from another cache memory. When receiving such a read request, a copy of the requested memory line may be sent to the requesting cache memory as a shared cache memory line and the state of the copied cache memory line remaining in cache memory may be changed to shared. The state of respective memory line may e.g. be changed from exclusive to modified if it is written to the respective memory line.

"Shared" identifies a memory line which may be stored in a plurality of cache memories and which is clean.

"Invalid" identifies a cache entry which is unused and not to be used to satisfy a memory access. The state of a memory line in a cache memory may be changed e.g. from shared to invalid if a copy of the respective memory line is requested by another cache memory as an exclusive memory line. For example, the shared copy of the respective memory line may be forwarded as an exclusive copy, while the remaining copied memory line is invalidated in order to avoid incoherence, i.e. that different cache memories are using different copies of the same memory line. In case an invalid memory line is to be read, a valid copy of the same, i.e. shared or exclusive has to be read from another cache memory or from the main memory.

The MOESI protocol in addition to the four common MESI protocol states comprises a fifth "Owned" state representing data that is both modified and shared. This may avoid the need to write modified data back to main memory before sharing it. While the data must still be written back eventually, the write-back may be deferred. "Modified" identifies a memory line which is the only valid copy of the memory line and which has been amended.

"Owned" identifies a copy of a memory line which is the only one which may be amended, while other processor cache memories may comprise valid copies as well which however are not allowed to be amended. Amendments of the owned memory line have to be broadcast to all other processor cache memories sharing the memory line. The introduction of owned state allows dirty sharing of data, i.e. an amended memory lines may be moved around various processor cache memories without updating the main memory. The memory line may be changed to the Modified state after invalidating all shared copies, or changed to the Shared state by writing the amendments back to main memory.

The memory barrier instruction provides an ordering function that ensures that all memory instructions initiated prior to the memory barrier instruction complete, and that no subsequent memory instructions initiate until after the memory barrier instruction completes. When the memory barrier instruction completes, all memory accesses initiated prior to the memory barrier instruction are complete.

Memory barrier instructions may be necessary because modern processors may employ performance optimizations that can result in out-of-order execution. This reordering of memory operations, like e.g. loads and stores, may go unnoticed within a single thread of execution. However, in case concurrent programs and device drivers such performance optimizations may result in an unpredictable behavior unless sufficiently controlled.

The shared memory system is configured to permit a weakly ordered execution of load and store memory access instructions across processor devices. An instruction sequence of a processor comprises a memory barrier instruction which enforces execution of the sequence's previous access instructions by the processor device and the propagation of coherence across the shared memory system before the execution of the sequence's subsequent instructions. Embodiments may have the beneficial effect of implementing a memory barrier instruction with fast execution, while using few computer resources.

A typical coherence propagation may invalidate one or more cached copies of a memory line's earlier value.

According to embodiments, a shared memory system permitting a weakly ordered execution of load and store memory access instructions across processor devices comprises a plurality of processors. Each processor comprises an unpropagated buffer for storing unpropagated memory lines. The unpropagated buffer tracks the memory line addresses of the previous accesses by the processor for which the propagation of coherence to other processors is unknown. Furthermore, each processor comprises a memory barrier instruction implemented by stalling the execution by the processor of its instruction sequence's subsequent memory access instructions until the unpropagated buffer is empty.

According to embodiments, a message concerning memory line to be sent by a coherence directory to a processor cache memory N comprises a propagated field indicating whether memory coherence in respect of memory line has been propagated. If a transient entry of the coherence directory for the memory line expects the coherence directory to receive an invalidate acknowledgement message from one or more processor cache memories which cached an earlier copy of the memory line, the coherence directory sets the propagated field of message to no.

If a directory entry or a transient entry of the directory for the memory line expects the coherence directory to receive no invalidate acknowledgement message from the one or more processor caches which cached an earlier copy of the memory line, the coherence directory sets the propagated field of message to yes. If the line had a transient entry and if the propagated field of message is set to yes, the coherence directory sets a propagation notify field for cache N in the transient entry of the coherence directory for the line to no.

If the propagated field of message is set to no, the coherence directory sets a propagation notify field for cache N in the transient entry of the coherence directory for the memory line to yes.

If the coherence directory updates the transient entry of the memory line and if the updated transient entry expects the coherence directory to receive no invalidate acknowledgement message from processor cache memories which cached an earlier copy of memory line, the coherence directory sends a propagated message for the memory line to each processor cache memory for which the propagation notify field is set to yes in the transient entry for the memory line.

For each such a propagated message sent by the coherence directory to a processor cache memory, the coherence directory sets in the transient entry the corresponding propagation notify field for the processor cache memory to no.

According to embodiments, the coherence directory updates the transient entry of a memory line as part of the coherence directory actions caused by the coherence directory receiving a message from a processor cache memory concerning a memory line.

According to embodiments, the identifier of the flagged memory line stored in the buffer comprises the memory address of the respective memory line in the main memory. Embodiments may have the beneficial effect of providing an efficient identifier for identifying memory lines. Since the memory address is already used to identify the memory line in the main memory and maybe in the processor cache memory as well, no additional logic for translating or interpreting identifiers is required.

According to embodiments, the memory coherence of the shared memory system is implemented using a coherence directory. Embodiments may have the beneficial effect of providing a central unit in form of the coherence directory which may control, check and confirm propagation of coherence across the shared memory system.

According to embodiments, at least one of the first and the second flag information is provided by a message received by the processor device from the coherence directory. Embodiments may have the beneficial effect that the coherence directory confirms propagation of coherence across the shared memory system. According to embodiments, at least one of the first and the second flag information is provided by a message sent by the processor device to the coherence directory. Embodiments may have the beneficial effect of announcing a requirement to confirm a propagation of coherence across the shared memory system.

According to embodiments, the memory coherence of the shared memory system is implemented using broadcasting. Embodiments may have the beneficial effect that broadcast-based protocols for implementing coherence of the shared memory system do not need a central coherence directory. Furthermore, no central coherence directory has to be checked and maintained in order to implement memory coherence. Thus, if sufficient bandwidth is available, broadcast-based protocols for implementing memory coherence may be faster than directory-based protocols, since all transactions of a memory line comprise a request/request seen by all processors. A drawback of a broadcast-based protocol is its lack of scalability. Every request has to be broadcasted to all nodes in the system, i.e. all the processor cache memories, meaning that as the system gets larger, the required bandwidth for implementing the method grows.

According to embodiments, the instruction causing the processor device to fill the copy of the memory line to the processor cache memory is an instruction specifying a write access to the respective memory line. According to embodiments, the propagation of the memory coherence across the shared memory system comprises invalidating further copies of the memory line used by remote processor cache memories of further processor devices of the shared memory system. Embodiments may have the beneficial effect that it may be ensured that no further processor device uses an out-of-date shared read copy of the memory line, i.e. a stale copy, while the processor device writes a new copy of the respective memory line.

According to embodiments, the identifier of the flagged memory line stored in the buffer comprises the memory address of the respective memory line in the main memory. Embodiments may have the beneficial effect of using a common identifier to identify a memory line in the main memory, in the processor cache memories and in the buffer of the processor device.

According to embodiments, the amendment requested by the coherence directory comprises an invalidation of a further copy of the memory line comprised by the remote processor cache memory. Embodiments may have the beneficial effect of ensuring that none of the remote processor cache memory uses an out-of-date copy of the memory line, i.e. stale copy, while the processor device fills a new copy of the respective memory line to the processor cache memory. Thus, a usage of incoherent copies of the memory lines as well as introducing a race condition may be effectively avoided.

FIG. 1 depicts a computer system 100 which is suited for implementing a shared memory system. It will be appreciated that the methods described herein are automated by way of computerized systems. These methods may further be implemented in software 112, 122 (including firmware 122), hardware (processor) 105, or a combination thereof. In exemplary embodiments, the methods described herein are implemented in software, as executable instructions, and may be used by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 may be, but is not limited to, one or more buses or other wired or wireless connections, as is known in the art. The input/output controller 135 may have additional elements, which are omitted for simplicity, such as controllers, buffers, caches, drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 may be any custom made or commercially available processor, a central processing unit (CPU), an auxiliary processor among several processors associated with the computer 101, a semiconductor-based microprocessor (in the form of a microchip or chip set), a macroprocessor, or generally any device for executing software instructions. The processor 105 may comprise and/or be communicatively connected with one or more local cache memories. The processor 105 may comprise one or more processor cores. Each of the processor cores may be operatively connected with one or more local processor cache memories. The processor 105 may be implemented in form of a plurality of processor chips, each processor chip may comprise one or more local processor cache memories. The processor cache memories may each comprise a cache memory controller for controlling the respective cache memory. In case of multiple processor cache memories, memory coherence may be implemented in form of directory-based memory coherence or broadcast-based memory coherence.

The memory 110 may include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 may have a distributed architecture, where various components are situated remote from one another, but may be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112.

The software in memory 110 shall also typically include a suitable operating system (OS) 111. The OS 111 essentially controls the execution of other computer programs, such as possibly software 112.

The methods described herein may be provided in the form of a source program 112, executable program 112 (object code), script, or any other entity comprising a set of instructions 112 to be performed. When being provided as a source program, then the respective program needs to be translated via a compiler, assembler, interpreter, or the like, which may or may not be included within the memory 110, so as to operate properly in connection with the OS 111. Furthermore, the methods may be written as an object-oriented programming language, which has classes of data and methods, or a procedure programming language, which has routines, subroutines, and/or functions.

In exemplary embodiments, a conventional keyboard 150 and mouse 155 may be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 may be any generalized cryptographic card or smart card known in the art. The system 100 may further include a display controller 125 coupled to a display 130. In exemplary embodiments, the system 100 may further include a network interface for coupling to a network 165.

The network 165 may be an IP-based network for communication between the computer 101 and any external server, client and the like via a broadband connection. The network 165 transmits and receives data between the computer 101 and external systems 30, which may be involved to perform part or all of the steps of the methods discussed herein. In exemplary embodiments, network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, smart device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS may be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed. The storage 120 may comprise a disk storage such as HDD storage.

Figure 2:
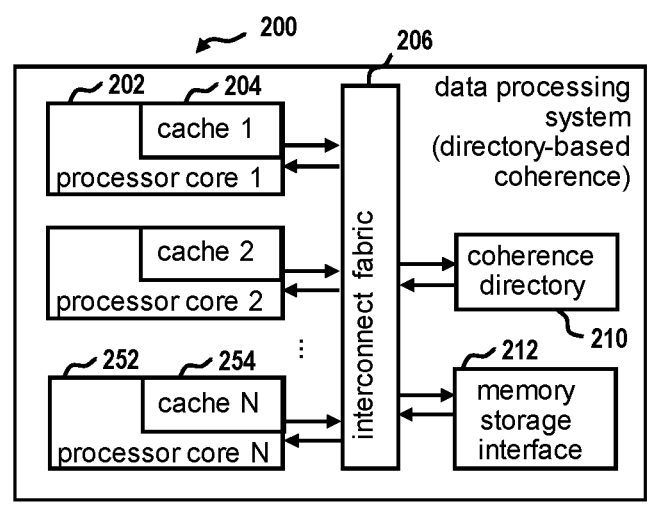
FIG. 2 depicts a schematic diagram of an exemplary coherent shared memory system.

FIG. 2 shows an exemplary coherent shared memory system 200 in form of a data processing system which implements directory-based coherence using a coherence directory 210. The coherent shared memory system 200 comprises a plurality of N processor cores 202, 252, each connected with a local processor cache memory 204, 254. Data is exchanged between the processor cache memories 204, 254 via an interconnect fabric 206. The interconnect fabric 206 further connects the processor cache memories 204, 254 with the coherence directory 210. The coherence directory 210 keeps track of the content of the processor cache memories 204, 254, i.e. the memory lines comprised by the same, thus implementing coherence. In addition, the interconnect fabric 206 connects the cache memories 204, 254 to a memory storage interface 212. Via the memory storage interface 212 data may be received from and sent to a backing storage in form of a shared memory, like e.g. a main memory. For example, processor core 1 tries to retrieve a memory line from processor cache memory 1 resulting in a cache miss, since processor cache memory 1 does not comprise a valid copy of the requested memory line or processor core 1 may e.g. request a write copy, but processor cache memory 1 may only comprise a read copy. Processor core 1 may sent a request for a valid copy of the desired memory line via interconnect fabric 206 to the coherence directory 210. Coherence directory 210 checks whether any of the further processor cache memories comprises the requested memory line. In case one of the further processor cache memories comprises the desired memory line, coherence directory 210 may forward the request to the respective further processor cache memory comprising the desired memory line. In case cache none of the further processor cache memories comprises the desired memory line, coherence directory 210 may forward the request via memory storage interface 212 to the backing storage. Thus, a valid copy of the desired memory line may be transferred to the requesting processor core 1 which fills the respective memory line in the cache memory 1.

Figure 3:
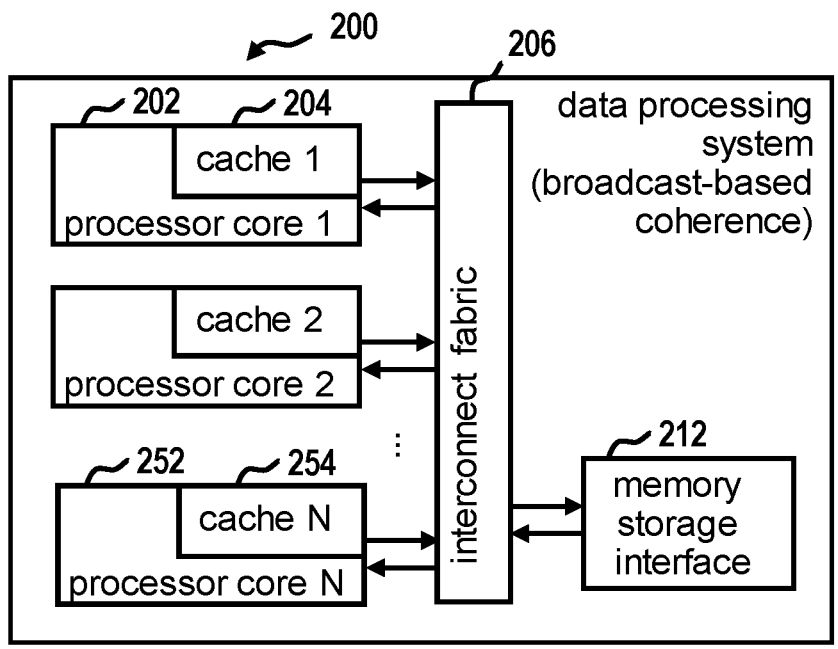
FIG. 3 depicts a schematic diagram of an exemplary coherent shared memory system.

FIG. 3 shows an exemplary coherent shared memory system 200 in form of a data processing system comprising a plurality of processor cores 202, 252 each provided with a local processor cache memory 204, 254. Memory coherence is implemented based on broadcasting. In contrast to the shared memory system of FIG. 2, the coherent shared memory system 200 of FIG. 3 comprises no coherence directory. In case of broadcast-based coherence, processor core 1, in case of a cache miss, broadcasts the request for a valid copy of the desired memory line via interconnect fabric 206 to the further processor cores 2 to N of the coherent shared memory system 200. In case processor core 1 receives no reply comprising the requested valid copy of the desired memory line, processor core 1 may request the copy via interconnect 206 and memory storage interface 212 from the backing storage.

Figure 4:
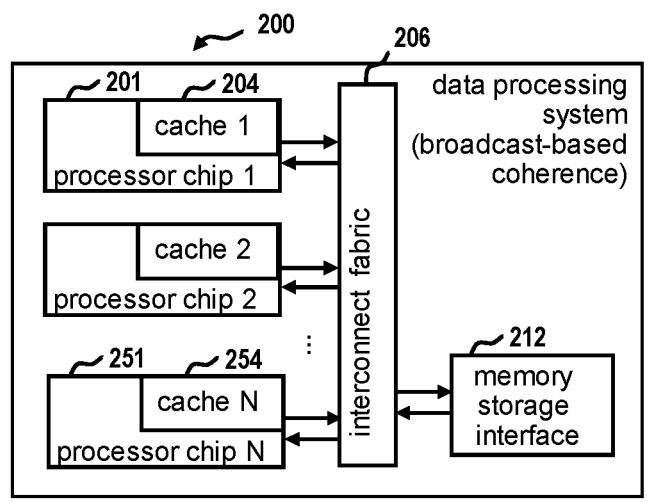
FIG. 4 depicts a schematic diagram of an exemplary coherent shared memory system.

FIG. 4 shows an exemplary coherent shared memory system 200 in form of a data processing system comprising a plurality of processor chips 201, 251. Each processor chip is provided with a local processor cache memory 204, 254. Memory coherence of the cache memories 204 is implemented based on broadcasting. The interconnect fabric 206 enables communication between the cache memories 204, 254, and a memory storage interface 212. The memory storage interface 212 may e.g. be provided by a memory subsystem chip. Retrieving a valid copy of a desired memory line may be performed analogously to the method of FIG. 3.

Figure 5:
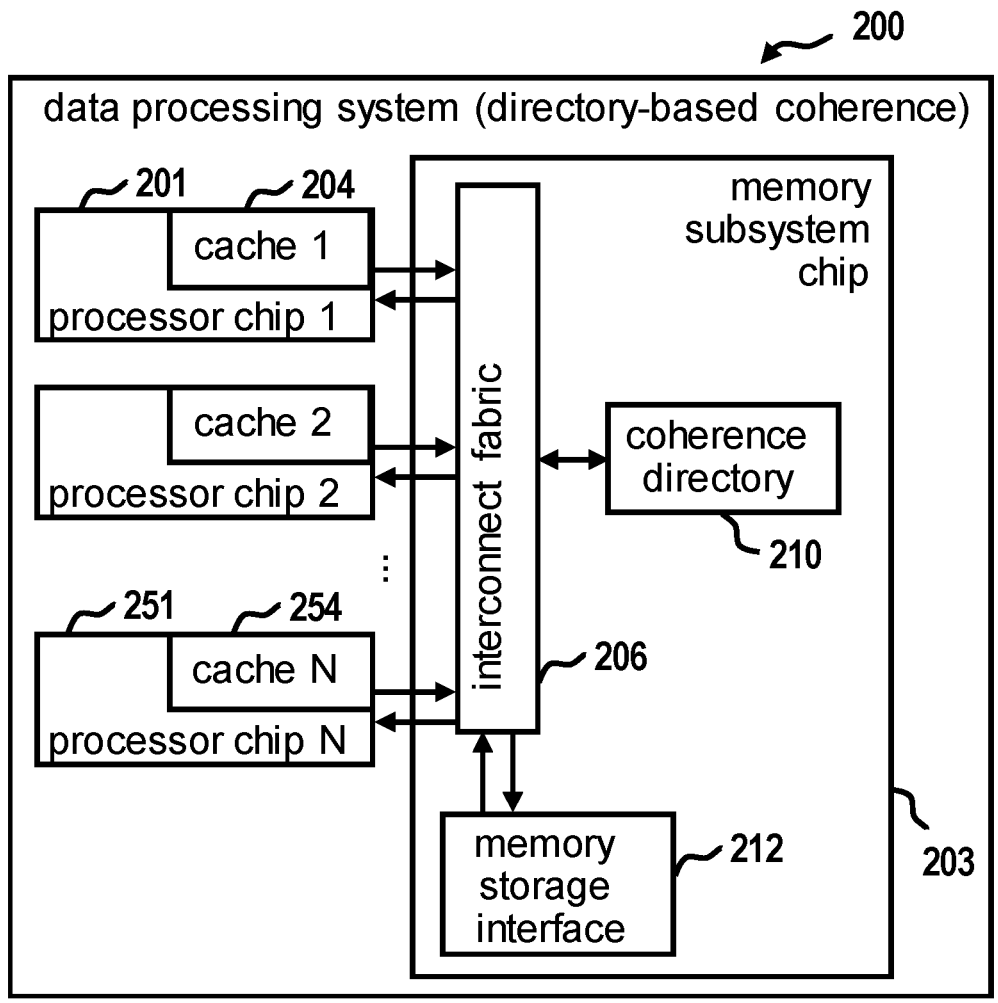
FIG. 5 depicts a schematic diagram of an exemplary coherent shared memory system.

FIG. 5 shows an exemplary coherent shared memory system 200 in form of a data processing system comprising a plurality of processor chips 201, 251. Each processor chip is provided with a local processor cache memory 204, 254. Memory coherence of the cache memories 204 is implemented using coherence directory 210 provided by a memory subsystem chip 203. The memory subsystem chip 203 further provides an interconnect fabric 206 enabling communication between the cache memories 204, 254, the coherence directory 210 and a memory storage interface 212. The memory storage interface 212 may e.g. be provided by the memory subsystem chip 203. Retrieving a valid copy of a desired memory line may be performed analogously to the method of FIG. 2.

Figure 6:
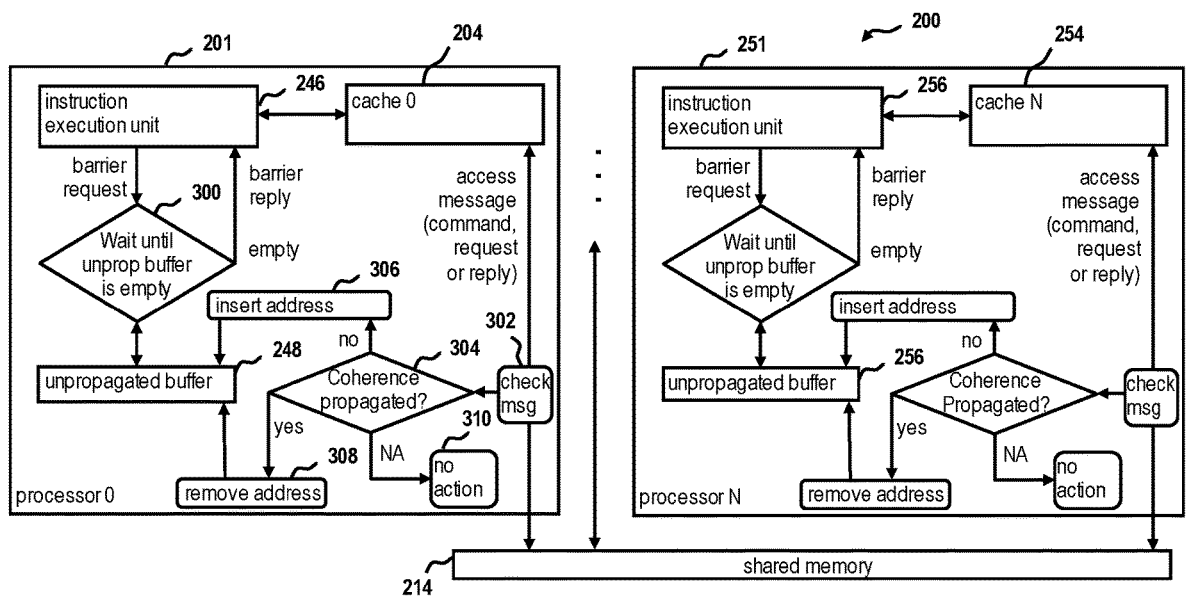
FIG. 6 depicts a schematic diagram of an exemplary method of execution of an instruction sequence.

FIG. 6 shows an exemplary method of coordinating an execution of instructions by a processor device, like e.g. a processor chip 201, using a barrier instruction. The processor chip 201 comprises an instruction execution unit 246 executing instructions. An instruction executed may require a copy of a memory line. The instruction may e.g. be a read or a write instruction. The instruction execution unit 246 checks whether the processor cache memory 204 comprises the required memory line. In case of a cache miss, a request is sent to the shared memory 214 requesting a copy of desired memory line in order to fill the copy into processor cache memory 204. Messages sent to the shared memory 214, like e.g. requests or commands, as well as messages received from the shared memory 214, are checked in step 302 for information regarding the propagation of memory coherence across the shared memory system 200 in respect of the filling of the copy of the memory line. For example, a reply may be received from the shared memory 214 comprising the requested copy of the memory line. The copy of the memory line provided by the reply is filled into processor cache memory 204, e.g. in order to complete the execution of the aforementioned instruction or to accelerate an execution of potential subsequent instructions using prefetching. In step 302, either the message itself or a copy of the same generated for the check may be used. The messages may each comprise a coherence propagation field which is checked in step 304. In case the coherence propagation field comprises flag information indicating that the propagation of memory coherence in respect of the filling of the copy of the memory line is unconfirmed, an indicator of the respective memory line, like e.g. its memory address, is added to a buffer 248 of processor chip 201 in step 306. Buffer 248, also referred to as unpropagated buffer, may comprise an unordered set of addresses of memory lines for which propagation of memory coherence across the shared memory system 200 has not been confirmed yet. In case the coherence propagation field comprises flag information indicating that the propagation of memory coherence in respect of the filling of the copy of the memory line is confirmed, the indicator, if present, of the respective memory line is removed from buffer 248 of processor chip 201 in step 308. In case the coherence propagation field comprises information indicating that no action regarding buffer 248 is required, no action 310 is performed.

Upon executing a memory barrier instruction by the instruction execution unit 246 of processor chip 201, a barrier request is sent to buffer 248, checking whether the buffer 248 comprises any indicators indicating memory lines for which propagation of coherence across the coherent shared memory system 200 has not been confirmed yet. In case the buffer 248 comprises any indicators, in step 300 it is waited until buffer 248 is empty. As long as buffer 248 is not empty, completion of the execution of the barrier instruction is prevented. In case it is determined that buffer 248 is empty, a barrier reply is sent to instruction execution unit 246 informing the instruction execution unit 246 that buffer 248 is empty. As soon as buffer 248 is empty, instruction execution unit 246 completes the execution of the barrier instruction.

Figure 7:
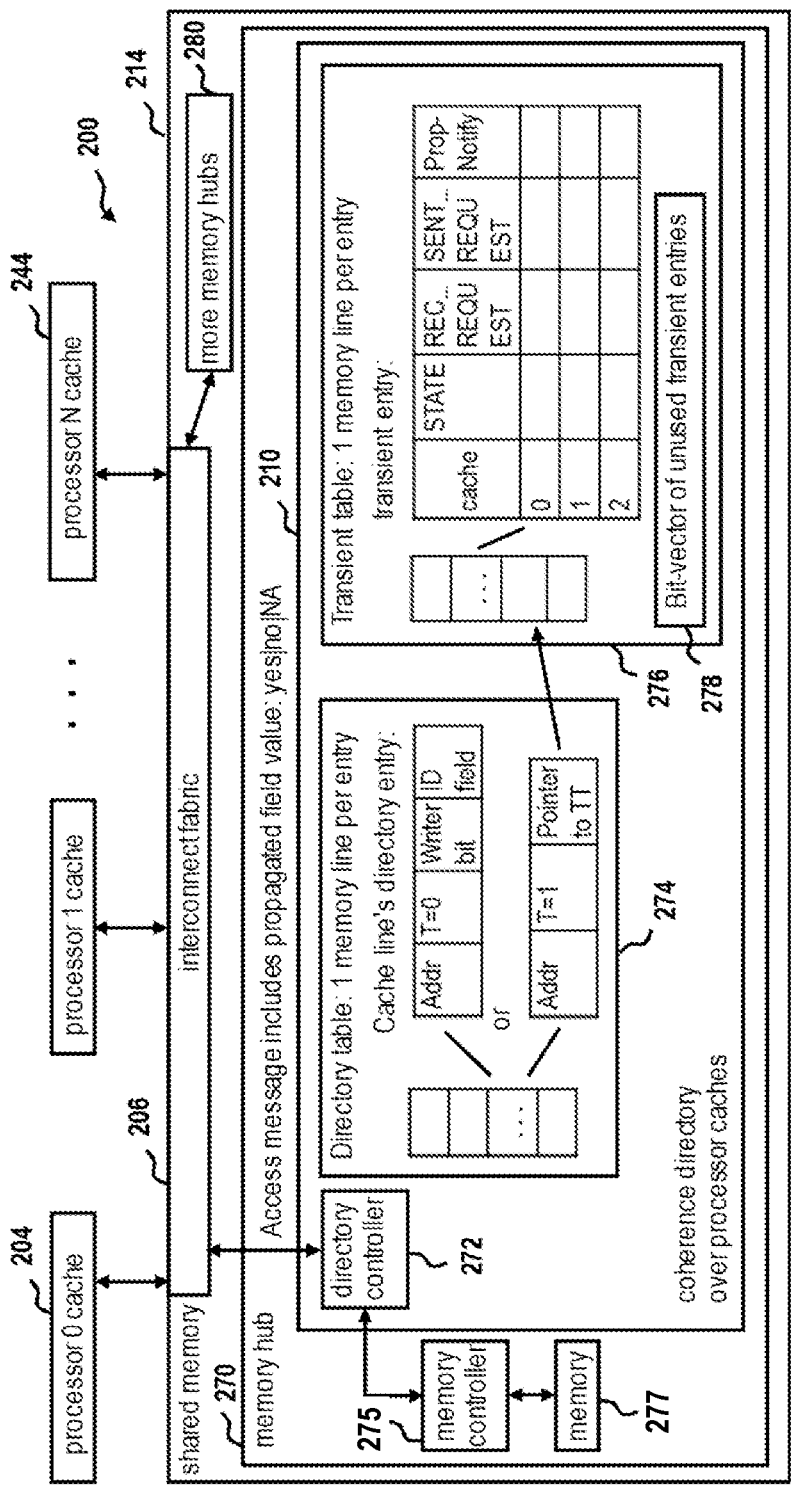
FIG. 7 depicts a schematic diagram of an exemplary coherent directory implementing coherence of a shared memory system.

FIG. 7 shows an exemplary coherence directory 210 of a coherent shared memory system 200. The coherent shared memory system 200 comprises a plurality of processor cache memories 204, 244, which are communicatively connected with a shared memory 214 via an interconnect fabric 204. The shared memory 214 may comprises a plurality of memory hubs 270, 280. Request from the processor cache memories 204, 244 in case of cache misses are sent via the interconnect fabric 206 to the coherence directory 210. The coherence directory 210 comprises a directory controller 272 controlling the coherence directory 210. The coherence directory 210 may further comprise a directory table 274. The directory table 274 may comprise a plurality of entries with one memory line per entry. In other words, each entry of directory table 274 may be assigned to one memory line, a copy of which is used by one or more of the processor cache memories 204, 244. The entries may comprise an address tag with the memory address of the memory line to which the respective entry is assigned, status information, access type information and ID information. The status information may indicate whether the status of the copy of the memory line in the processor cache memories 204, 244 is stable, i.e. T=0, or whether it is currently undergoing a change such that the status is transient, i.e. T=1. In case of a stable status, currently no changes are occurring. The entry may further identify the access type of the memory line by the processor cache memories 204, 244, like e.g. a shared read access or exclusive write access. Furthermore, the processor cache memories 204, 244 currently using a copy of the memory line may be identified by the ID information, which e.g. may comprise an identifier of a processor operatively connected with the processor cache memory 204, 244 to be identified and/or an identifier of the respective processor cache memory 204, 244 itself.

In case that the status of the copies of the memory line in the processor cache memories 204, 244 is a transient, i.e. the copies of the memory line currently undergo changes in order to establish coherence through the processor cache memories 204, 244, the directory table entry may comprise a pointer to an entry in a transient table 276. For example, in case an exclusive write copy of the memory line is requested by one of the processor cache memories 204, 244, shared read copies used by other processor cache memories 204, 244 have to be invalidated. The coherence directory 210 may comprise a transient table 276 in order to track the propagation of coherence across the shared memory system in respect of individual memory line. In case a copy of a memory line is in a transient state, an entry may be generated for the respective memory line in the transient table 276. The transient table 276 may comprise a plurality of entries with one memory line per entry. In other words, each entry of transient table 276 may be assigned to one memory line with transient copies used by one or more of the processor cache memories 204, 244. An entry of the transient table 276 may identify all the processor cache memories 204, 244 currently using copies of the respective memory line. For each of these processor cache memories 204, 244, the entry may keep track of the latest state of the copy of the memory line used by the respective processor cache memories 204, 244, like e.g. shared read, exclusive write or invalid. Furthermore, the entry may keep track of requests received from the respective processor cache memory 204, 244 and outstanding requests sent to the respective processor cache memory 204, 244 by the coherence directory, i.e. requests for which replies are required. Finally, the transient table entry may comprise for each of these processor cache memories 204, 244 an indicator indicating whether the respective processor cache memories 204, 244 has to be notified as soon as a confirmation of the propagation of memory coherence across the shared memory system in respect of the memory line is obtained by the coherence directory 210. The transient table 276 may be accompanied by a bit-vector 278 indicating which entries of the transient table are currently free for use and which are currently used for tracking the propagation of coherence of a memory line.

Upon receiving a request for a copy of a memory line from one of the processor cache memories 204, 244, directory controller 272 of coherence directory 210 may determine using directory table 274 whether one of the remaining processor cache memories 204, 244 comprises a valid copy of the requested memory line. In case one of the remaining processor cache memories 204, 244 comprises a valid copy of the requested memory line, directory controller 272 may forward the request to the respective processor cache memory 204, 244 in order to retrieve a copy of the requested memory line. In case none of the remaining processor cache memories 204, 244 comprises a valid copy of the requested memory line, directory controller 272 may forward the request to a memory controller 275 controlling a memory 277 in order to retrieve a copy of the requested memory line from the respective memory 277.

Figure 8:
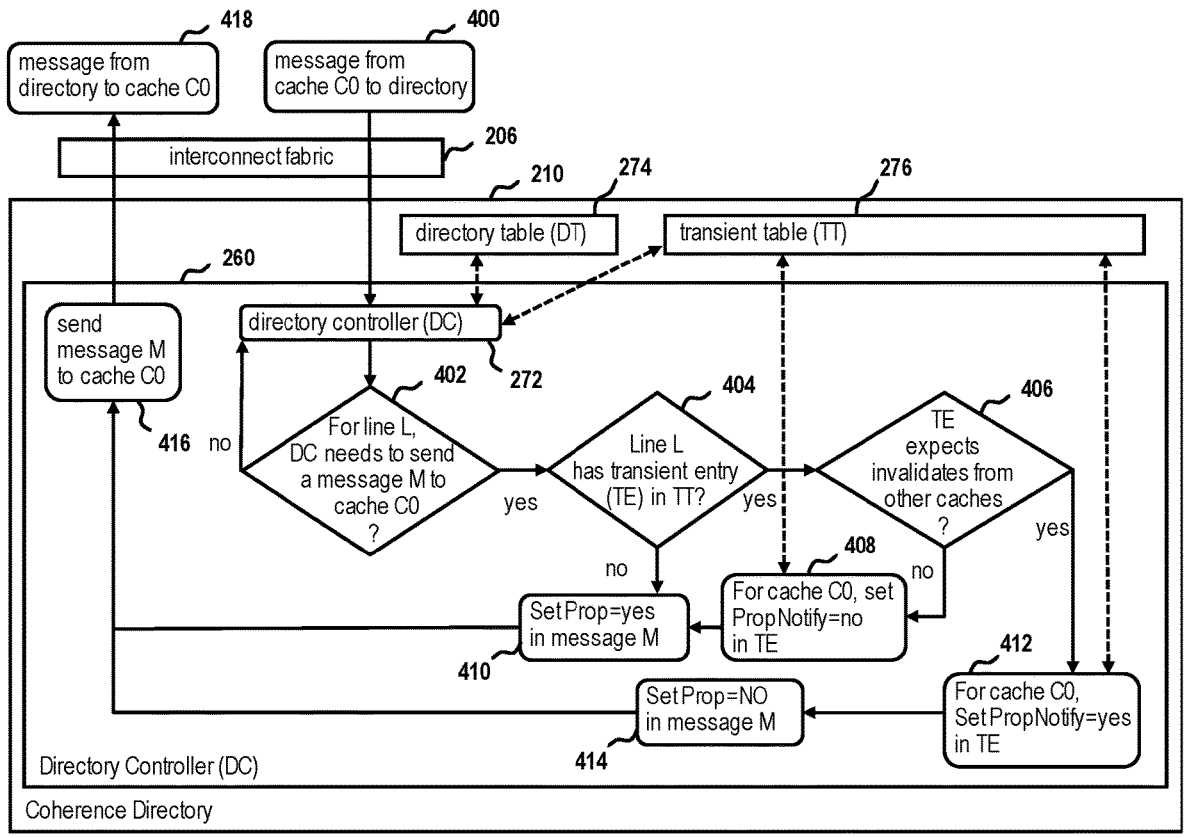
FIG. 8 depicts a schematic diagram of an exemplary method of managing a coherence directory implementing memory coherence of a shared memory system.

FIG. 8 shows an exemplary method for managing a coherence directory 210 implementing coherence of a shared memory system. In step 400, the coherence directory 210 receives a message from a processor cache memory, e.g. C0, of the shared memory system via an interconnect fabric 206. The message may be related to a memory line L. For example, the message may be a request for a copy of memory line L. Directory controller 272 of coherence directory 210 may check in step 402 whether there is a requirement to send a message M to processor cache memory C0, e.g. in reply to the received message. For example, DC may need to send a message M in form of a reply comprising the requested memory line L to processor cache memory C0. In case there is no requirement to send a message M, directory controller 272 may continue processing the received message depending on its content. In case there is a requirement to send a message M, the method may continue with step 404. In step 404, directory controller 272 checks whether transient table 276 comprises a transient entry for memory line L. For this purpose, directory controller 272 may first check directory table 274. In case directory table 274 has an entry for memory line L, directory controller 272 may check whether the respective entry of directory table 274 comprises a pointer to an entry transient table 276 assigned to memory line L. In case transient table 276 comprises no transient entry for memory line L, the method may continue with step 410. In step 410, a flag information may be added to message M indicating that propagation of memory coherence across the shared memory system in respect of memory line L is confirmed, i.e. Prop=yes. Since the shared memory system comprises no transient state of a copy of memory line L, memory coherence for memory line L is stable and no propagation necessary. In step 416, message M is sent via interconnect fabric 206 to processor cache memory C0. In step 418, processor cache memory C0 receives message M from coherence directory 210.

In case it is determined in step 404 that transient table 276 comprises a transient entry for memory line L, the method may continue with step 406. A transient entry for memory line L implies that coherence in respect of memory line L has to propagate across the shared memory system. In step 406, it is checked using transient table 276 whether there are actions to be performed by one or more of the processor cache memories of the shared memory system in order to establish coherence. For example, it may be expected that one or more valid copies of memory line L have to be invalidated in order establish coherence. In case there are no remaining actions to be performed, the method may continue in step 408. Since memory line L is in a transient state, i.e. coherence has not yet been confirmed memory line L, the coherence propagation notification indicator for processor cache memory C0 in the transient entry of memory line L in transient table 276 may indicate that processor cache memory C0 has to be provided with a confirmation of the propagation of coherence as soon as the such a confirmation is obtained by directory controller 272 of coherence directory 210. No remaining actions indicates that the propagation of coherence has successfully been completed, i.e. provides confirmation for the propagation. In step 408, in case the processor cache memory C0 is informed about the confirmation, the propagation notification indicator for processor cache memory C0 may be amended such that it indicates that the processor cache memory C0 is not required to be provided with a confirmation of the propagation of coherence, while in step 410 the respective confirmation is added to message M. Message M is then sent to processor cache memory C0 as shown in steps 416 and 418.

In case the check of step 406 indicates that there are still actions to be performed, the method may be continued with step 412. Such actions to be performed may be indicated by outstanding requests recorded in the transient entry of memory line L, i.e. identifying request which have not yet been executed or confirmed. In step 412, it is ensured that the coherence propagation notification indicator for processor cache memory C0 in the transient entry of memory line L in transient table 276 indicates that processor cache memory C0 has to be provided with a confirmation of the propagation of coherence as soon as the such a confirmation is obtained by directory controller 272 of coherence directory 210. In step 414, a flag information may be added to message M indicating that propagation of memory coherence across the shared memory system in respect of memory line L is unconfirmed, i.e. Prop=no. Message M is then sent to processor cache memory C0 as shown in steps 416 and 418.

Figure 9:
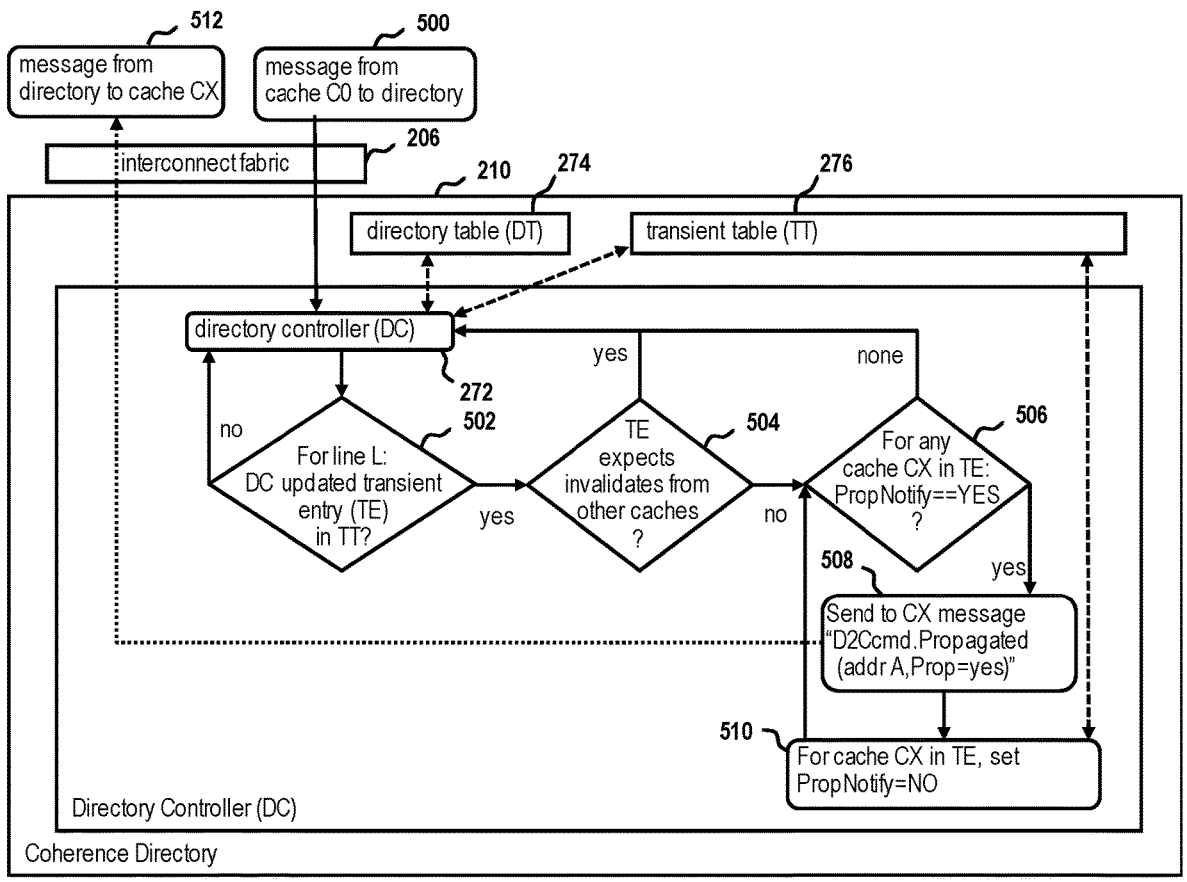
FIG. 9 depicts a schematic diagram of an exemplary method of managing a coherence directory implementing memory coherence of a shared memory system.

FIG. 9 shows an exemplary method for managing a coherence directory 210 implementing coherence of a shared memory system using the same infrastructure as shown in FIG. 8. In step 500, the coherence directory 210 receives a message from a processor cache memory, e.g. C0, of the shared memory system via interconnect fabric 206. The message may be related to a memory line L. For example, the message may be a request for a copy of memory line L. In step 502, directory controller 272 of coherence directory 210 checks whether the directory controller 272 updated a transient entry for memory line L in the transient table 276 using directory table 274 and transient table 276. In case directory controller 272 determines that there is no update of a transient entry for memory line L in the transient table 276, directory controller 272 continues processing the received message depending on its content. In case directory controller 272 has updated a transient entry for memory line L in the transient table 276, the method may continue with step 504. In step 504, it is checked using transient table 276 whether there are actions to be performed by one or more of the processor cache memories of the shared memory system in order to establish coherence. For example, it is checked whether according to the transient entry of memory line L, a reply acknowledging an invalidation of a copy of memory line L used by one of the processor cache memories of the shared memory system is expected. In case directory controller 272 determines that actions are expected to be executed for establishing coherence, directory controller 272 may continue processing the received message depending on its content, e.g. according to the method of FIG. 8. In case directory controller 272 determines that no actions are expected to be executed for establishing coherence, the method may continue with step 506. In step 506, it is checked by the directory controller 272 whether the transient entry of memory line L comprises a coherence propagation notification indicator identifying any processor cache memory CX, X∈{0, 1, ..., N}, of the shared memory system to be notified in case the propagation of coherence across the shared memory system in respect of memory line L is confirmed. In case directory controller 272 determines one or more processor cache memories CX, a message in form of a command "D2Ccmd.Propagated (addr A, Prop=yes)" is sent in step 508 to each of the processor cache memories CX indicating that the propagation of coherence across the shared memory system in respect of memory line L with memory address A is confirmed, i.e. Prop=yes. The message is received by the processor cache memories CX in step 512. In step 510, the coherence propagation notification indicator for the notified processor cache memories CX are changed such that the indicators indicate no information requirement for processor cache memories CX anymore.

Figure 10A:
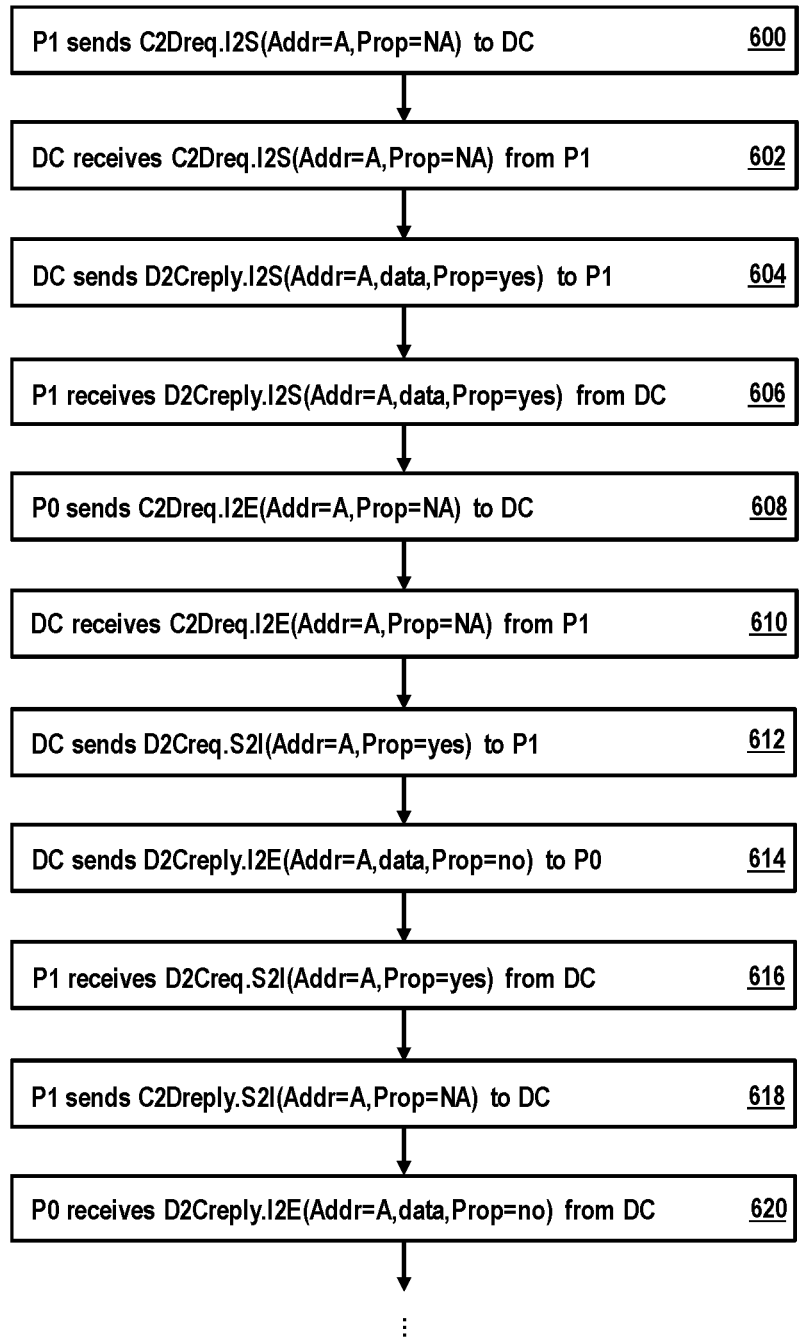
FIGS. 10A and 10B depict a flow diagram of an exemplary method of executing an instruction sequence and implementing memory coherence of a shared memory system.
Figure 10B:
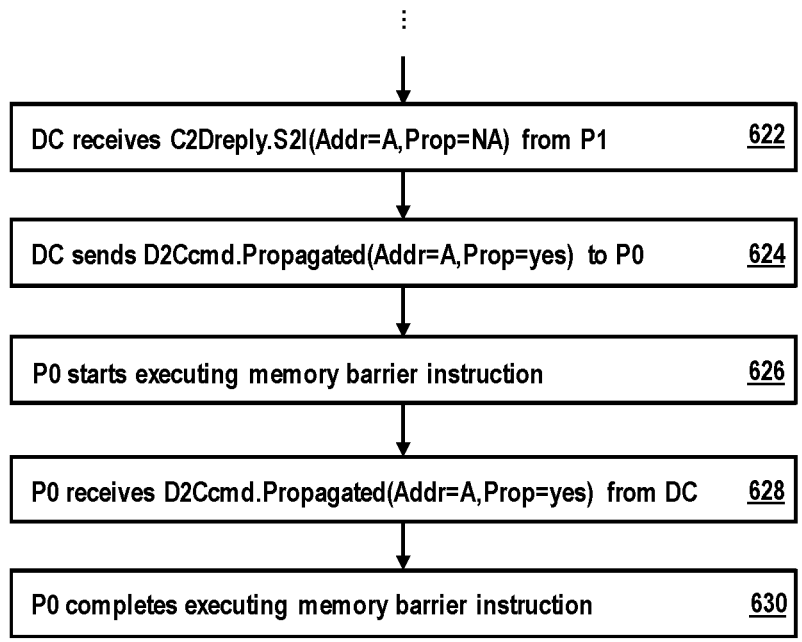

FIGS. 10A and 10B show an exemplary method for coordinating an execution of an instruction sequence using a barrier instruction by a processor of a coherent shared memory system. Coherence of the shared memory system may be implemented using a coherence directory. A processor, i.e. P0, of the shared memory system may execute an instruction of an instruction sequence. The execution of the instruction may comprise writing to a memory line with memory address A, i.e. filling an amended copy of the memory line with memory address A to a processor cache memory of P0. A memory barrier instruction comprised by the instruction sequence is executed by P0. The execution of the memory barrier instruction is prevented from being completed until propagation of memory coherence across the shared memory system in respect of the amended copy of the memory line with memory address A is completed and confirmed. For example, the effect of the P0 write has to propagate to a further processor of the shared memory system, e.g. P1. Initially, none of the processor cache memories may hold a copy of the memory line with address A. Thus, the directory table on a memory hub with the coherence directory may comprises no entry referring to the memory line memory address A.

In step 600, processor P1 may execute a read instruction "load A", which misses in local processor cache memory C1 of P1. Therefore, C1 issues a request to the coherence directory, e.g. C2Dreq.I2S(Addr=A, Prop=NA), which comprises information indicating no action (NA) on an unpropagated buffer UB1 of P1 are required. Request C2Dreq.I2S (Addr=A, Prop=NA) is a request (req) sent from a processor cache memory (C) to a coherence directory (D) requesting a shared read copy (S) of a memory line with address A. In step 602, directory controller, i.e. DC, of the coherence directory receives request C2Dreq.I2S(Addr=A, Prop=NA). DC finds no entry for memory address A in the directory table, i.e. DT, of the coherence directory. Thus, DC establishes in DT a new entry of type stable, i.e. T=0, and type shared read, i.e. W=0. The resulting entry in DT may e.g. be of the form [Addr=A. T=0. W=0. P1 set in ID field]. DC uses a memory controller to get the requested data, i.e. a copy of the memory line with address A, from a main memory. In step 604, DC sends reply D2Creply.I2S(Addr=A, data, Prop=yes) to P1. In step 606, P1 receives the reply D2Creply.I2S(Addr=A, data, Prop=yes) which removes address A, if present, from UB1. Reply D2Creply.I2S (Addr=A, data, Prop=yes) causes the local processor cache memory C1 to establish an entry for the shared read copy of the memory line address A and to satisfy the "load A" instruction by filling the received shared read copy of the memory line address A into C1.

In step 608, assumed after completion of the aforementioned actions, P0 executes an instruction "store A, value", i.e. an instruction to write the value to the memory line with address A, which misses in C0 of P0. Thus, C0 issues a request C2Dreq.I2E(Addr=A, Prop=NA), which has no action (NA) on an unpropagated buffer UB0 of P0, and sends the request to the coherence directory. In step 610, DC receives request C2Dreq.I2E(Addr=A, Prop=NA) for an exclusive write copy of the memory line with memory address A. For the memory line with memory address A, DC finds in DT the above established stable, shared-read entry [Addr=A. T=0. W=0. P1 set in ID field]. In step 612, DC sends request D2Creq.S2I(Addr=A, Prop=yes) to P1 in order to cause P1 to invalidate the shared read copy of the memory line with memory address A in C1. Furthermore, DC chooses any one of the unused entries in the transient table, i.e. TT, e.g. noting its index as TTindexA. DC changes DT entry to type transient, i.e. T=1, resulting in entry [Addr=A. T=1. Pointer=TTindexA.]. Furthermore, DC sets TT entry at TTindexA to [P0(E, -, -, yes). P1(S, -, S2I, no). P2(I, -, -, no)] in order to encode the transient state according to syntax (LATEST_STATE, RECEIVED_REQUEST, SENT_REQUEST, PropNotify?) for each processor cache memory. The TT entry indicates that C0 of P0 comprises an exclusive write copy and has to be informed as soon as a confirmation of propagation of memory coherence across the shared memory system in respect of the filling of the exclusive write copy to C0 is completed. P1 comprises a shared read copy, but the coherence directory waits for a confirmation of execution of the invalidation request sent to C1 of P1. There is no requirement to inform C1 of P1 about the propagation of coherence in respect of the filling of the exclusive write copy to C0. Finally, a processor cache memory C2 of a further processor P2 of the shared memory system comprises an invalid copy of the memory line with address A and does not have to be informed about the propagation of coherence. DC uses a memory controller to get the requested data, i.e. a copy of the memory line with address A, from the main memory. In step 614, DC sends reply D2Creply.I2E(Addr=A, data, Prop=no) to processor P0. The reply to P0 comprises Prop=no and the transient entry for P0 comprises PropNotify=yes, because the transient entry for the memory line with address A identifies at least one processor other than P0, i.e. P1, with an outstanding SENT_REQUEST. In this scenario, P1 comprises SENT_REQUEST=S2I.

In step 616, P1 receives request D2Creq.S2I(Addr=A, Prop=yes) which removes address A, if present, from UB1. Request D2Creq.S2I(A, Prop=yes) further causes processor cache memory C1 to invalidate the shared read copy of the memory line with address A. In step 618, P1 issues and sends a reply C2Dreply.S2I(Addr=A, Prop=NA) to the coherence directory confirming the invalidation of the shared read copy of the memory line with address A. The reply indicates that no action, i.e. NA, on UB1 is required.

In step 620, P0 receives reply D2Creply.I2E(Addr=A, data, Prop=no), which adds the exclusive write copy of the memory line with address A to UB0. Reply D2Creply.I2E (Addr=A, data, Prop=no) causes C0 to establish an entry for the exclusive write copy of the memory line with address A and fill the respective memory line to C0. Furthermore, the instruction "store A, value" is executed by storing the respective value in the copy of the memory line with address A. Succeeding steps 612, 616 and 618 on the one hand and succeeding steps 614 and 620 on the other hand may occur concurrently or in any order.

In step 622, the directory controller DC receives from processor P1 reply C2Dreply.S2I(Addr=A, Prop=NA). For memory address A, DC finds in DT an entry of type transient, i.e. T=1, of the form [Addr=A. T=1. Pointer=TTindexA] with a pointer to TT entry [P0(E, -, -, yes). P1(S, -, S2I, no). P2(I, -, -, no)]. Reply C2Dreply.S2I (Addr=A, Prop=NA) from processor P1 causes DC to update the P1 values in the TT entry. The updated TT entry becomes [P0(E, -, -, yes). P1(I, -, -, no). P2(I, -, -, no)]. The updated TT entry comprises no outstanding SENT_REQUEST to any processors of shared memory system, thus confirming the propagation of coherence across the shared memory system. Furthermore, the updated TT entry comprises value P0(E, -, -, yes) which requests a notification of P0, when the propagation of coherence is confirmed.

In step 624, DC sends command D2Ccmd.Propagated (Addr=A, Prop=yes) to processor P0. Furthermore, DC clears PropNotify for P0, i.e. sets the TT entry to [P0(E, -, -, no). P1(I, -, -, no). P2(I, -, -, no)]. This TT entry does not describe any transient state, since no outstanding SENT_REQUEST to any of processors of shared memory system. In other words, the respective TT entry describes a stable state. Therefore, DC sets the entry in DT for the memory line with address A to type stable, i.e. T=0, and type exclusive write, i.e. W=1. The resulting DT entry is [Addr=A. T=0. W=1. P0 set in ID field]. Finally, DC clears TT entry with TTindexA and returns TTindexA to the unused entries 278 in the transient table.

In step 626, P0 executes a memory barrier instruction. The memory barrier instruction may e.g. require all write instructions issued before by the instruction sequence to be complete. The memory barrier instruction is prevented from being completed until UB0 is empty. Since P0 has not yet received D2Ccmd.Propagated(Addr=A, Prop=yes) from the coherence directory, UB0 still comprises address A and the memory barrier instruction is prevented from completion of execution. In step 628, C0 receives reply D2Ccmd.Propagated(Addr=A, Prop=yes) which removes address A from UB0. Thus, in step 628 the UB0 on P0 is empty and the memory barrier instruction is completed. In step 630, the execution of the instruction sequence on P0 continues.

Exemplary directory-to-cache (D2C) messages may e.g. comprise requests "D2Creq( )", replies "D2Creply( )", and commands "D2Ccmd( )". A request D2Creq( ) requires a subsequent reply C2Dreply( ). A reply D2Creply( ) is sent in response to a prior request C2Dreq( ). A command D2Ccmd ( ) has no subsequent reply.

Exemplary cache-to-directory (C2D) messages may e.g. comprise requests "C2Dreq( )", replies "C2Dreply( )", and commands "C2Dcmd( )". A request C2Dreq( ) requires a subsequent reply C2Dreply( ). A reply C2Dreply( ) is sent in response to a prior request C2Dreq( ). A command C2Dcmd ( ) has no subsequent reply.

When a message of memory access type, i.e. a message related to a filling a memory line to a processor cache memory, is sent or received by a processor device, a coherence propagation check unit of the processor device may check a coherence propagation notification field of the message in order to determine whether there is a requirement to act on an unpropagated buffer of the processor device and which actions are required. Message of memory access type may also comprise messages related to an invalidation of a memory line in a processor cache memory. Possible values of the coherence propagation notification field in memory access type messages may comprise: "Prop=yes" causes the memory address of the memory line in the respective message to be removed from the unpropagated buffer, if present. "Prop=no" causes the memory address of the memory line in the respective message to be added to the unpropagated buffer. "Prop=NA" causes no actions on the unpropagated buffer.

In the following table exemplary directory-to-cache (D2C) requests are provided:

| Message | Value of prop | Comment |
| --- | --- | --- |
| D2Creq.S2I(addr, prop) | yes\|no | yes\|no according to directory entry, for this and other appropriate D2C message types. |
| D2Creq.E2I(addr, prop) | yes\|no | |

In the following table exemplary directory-to-cache (D2C) replies are provided:

| Message | Value of prop | Comment |
| --- | --- | --- |
| D2Creply.I2E(addr, data, prop) | yes\|no | Exemplary scenario: Initially, memory line is shared read in one or more processor cache memories. The directory receives C2Dreq.I2E( ) from another processor, causing the directory to send D2Creq.S2I( ) to the initial processors. Directory sends D2Creply.I2E(propagated = no), since C2Dreply.S2I( ) is not yet received from all the initial processors. |
| D2Creply.I2S(addr, data, prop) | yes\|no | |
| D2Creply.I2S2I(addr, data, prop) | yes\|no | Even if a processor cache memory just briefly receives a tear-away copy of current memory line value, the memory line's propagation has to be tracked through the respective processor. |

In the following table an exemplary directory-to-cache (D2C) command is provided:

| Message | Value of prop | Comment |
| --- | --- | --- |
| D2Ccmd.Propagated(addr, prop) | yes | |

In the following table exemplary cache-to-directory (C2D) requests are provided:

| Message | Value of prop | Comment |
| --- | --- | --- |
| C2Dreq.I2S(addr, prop) | NA | |
| C2Dreq.I2E(addr, prop) | NA | |
| C2Dreq.O2M(addr, prop) | no | In MOESI protocol, a cache in the "owned" state may be moved to the "modified" state before contacting the coherence directory. |

In the following table exemplary cache-to-directory (C2D) replies are provided:

| Message Type | Value of prop | Comment |
| --- | --- | --- |
| C2Dreply.S2I(addr, prop) | NA | The barrier functionality requires a memory line in the unpropagated buffer to remain there, even if the respective memory line is no longer in the local cache memory. In this case, the memory line is removed by a later command D2Ccmd.Propagated(addr). The memory line is for example removed on request on receiving a request D2C.S2Ireq(addr). |
| C2Dreply.E2I(addr, prop) | NA | |

In the following table exemplary cache-to-directory (C2D) commands are provided:

| Message Type | Value of Prop | Comment |
| --- | --- | --- |
| C2Dcmd.I2M.zero(addr, prop) | no | For a memory line previously invalid in the local cache memory, local write-through of zero value is not yet propagated. |
| C2Dcmd.M2I(addr, data, prop) | NA | The barrier functionality requires a memory line in the unpropagated buffer to remain there, even if the respective memory line is no longer in the local cache memory. |
| C2Dcmd.S2I(addr, prop) | NA | The barrier functionality requires a memory line in the unpropagated buffer to remain there, even if the respective memory line is no longer in the local cache memory. |

Figure 11:
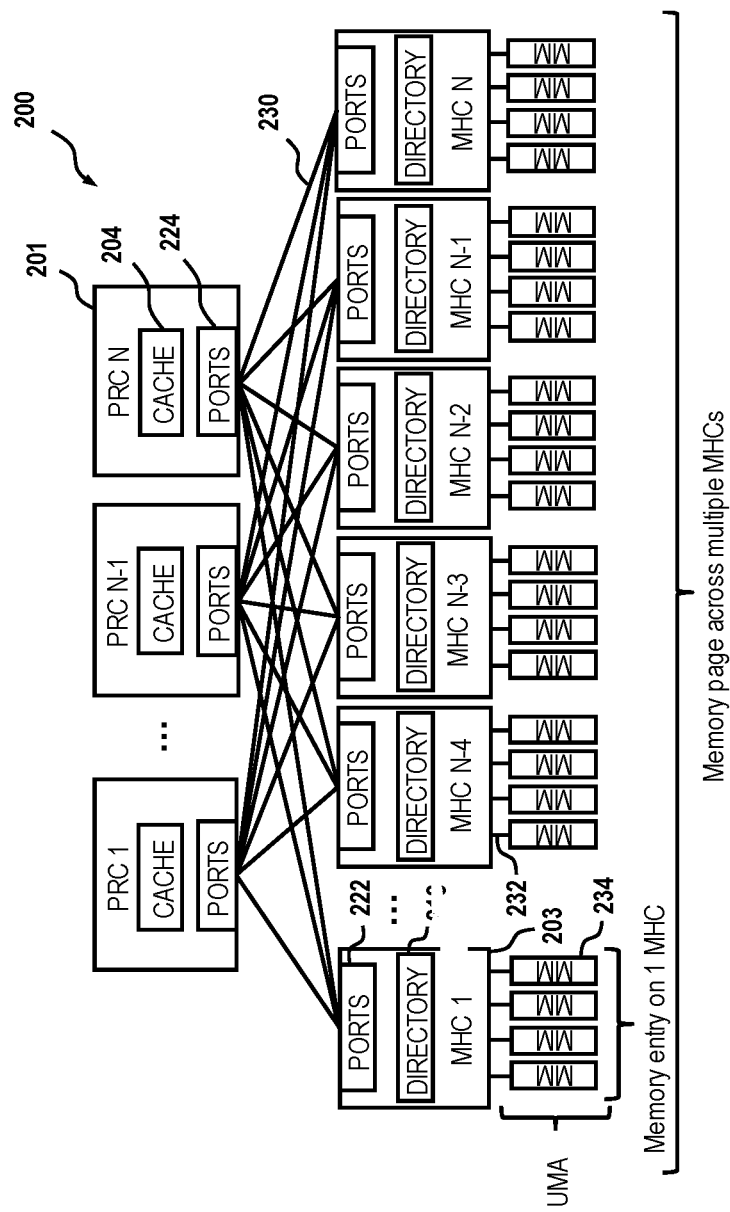
FIG. 11 depicts a schematic diagram illustrating an exemplary multi-processor architecture implementing a shared memory system.

FIG. 11 shows an exemplary coherent shared memory architecture in form of a multi-processor computer system in form of a multi-processor server 200 comprising multiple processor chips 201. The multi-processor server 200 comprises a set of memory hub chips 203. Each processor chip 201 may be provided with a plurality of ports 224. According to an embodiment the number of ports 224 provided per processor chip 201 may equal the number of memory hub chips 203. Each processor chip 201 is provided with a local cache memory 204 for caching memory lines, i.e. memory lines, to be processed by the processor chip 201. The processor chips 201 of the server 200 may or may not be configured identically. Application software may be executed on one or more processor chips 201 and thus a given application may implicitly or explicitly exploit and benefit from similar or different processor chips 201.

Each memory hub chip 203 may be provided with a plurality of local memory modules 234, e.g. dual in-line memory modules (DIMM) comprising a series of dynamic random-access memory integrated circuits. Thus, each memory hub chip 203 implements a memory hub device. Furthermore, each memory hub chip 203 may comprise a plurality of ports 222. For example, the number of ports 222 per memory hub chip 203 may be equal to the number of processor chips 201. In addition, for memory lines stored in the memory modules 234 local to the respective memory hub chip 203, each memory hub chip 203 may comprise a coherence directory 210 for implementing directory-based coherence for memory lines stored in the cache memories 204 of one or more processor chips 201. For the set of memory hub chips 203 of the server 200, all the memory hub chips 20 may be configured identically or similarly with each memory hub chips 203 performing similar functions. Application software may be executed on one or more processor chips 201 and thus performance of a given application typically benefits from memory being served by many and similar memory hub chips 203, with each particular memory address being served by a single predefined memory hub chip 203.

Each processor chip 201 may be communicatively coupled with each memory hub chip 203 e.g. via a bidirectional point-to-point communication connection 230, for example a serial communication connection. Thus, each processor chip 201 may be provided with memory access to each of the memory modules 234 local to one of the memory hub chips 203. The access to the memory modules 234 may be provided based on a uniform memory access (UMA) architecture. A given memory line, i.e. memory line, may be stored on one or more memory modules 234 as a backing storage, i.e. main memory, local to the same memory hub chips 203. A given memory page comprising a plurality of memory lines may e.g. be interleaved across the memory modules 234 of all memory hub chips 203.

The computer system may for example comprise 16 processor chips 201 and 128 memory hub chips 203. In this case, each processor chip 201 may comprise 128 ports 224 in order to be communicatively coupled to each of the memory hub chips 203. Furthermore, each of the memory hub chips 203 may be provided with 16 ports 222 such that each memory hub chip 203 may be communicatively coupled to each processor chip 201 via a distinct point-to-point communication connection 230.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Possible combinations of features described above can be the following:

1. A method for coordinating an execution of an instruction sequence comprising a plurality of instructions by a processor device of a coherent shared memory system, wherein the processor device is operatively connected with a processor cache memory, the method comprising:
    executing an instruction of the instruction sequence, wherein the execution of the instruction causes the processor device to fill a copy of a memory line of a main memory of the shared memory system to the processor cache memory by the processor device;
    upon detecting first flag information indicating that propagation of memory coherence across the shared memory system in respect of the filling of the copy of the memory line is unconfirmed, flagging the respective memory line by the processor device;
    upon detecting second flag information indicating that the propagation of the memory coherence across the shared memory system in respect of the filling of the copy of the memory line is confirmed, unflagging the respective memory line by the processor device;
    upon executing a memory barrier instruction of the instruction sequence, preventing by the processor device a completion of execution of the memory barrier instruction while the memory line is flagged.

2. The method of item 1, wherein the completion of execution of the memory barrier instruction is prevented until all memory lines previously flagged by the processor device are unflagged.
3. The method of any of the preceding items, wherein the flagging of the memory line comprises adding an identifier of the memory line to a buffer of the processor device and wherein the unflagging of the flagged memory line comprises removing the identifier of the memory line from the buffer of the processor.
4. The method of item 3, wherein the identifier of the flagged memory line stored in the buffer comprises the memory address of the respective memory line in the main memory.
5. The method of any of items 3 or 4, wherein the completion of execution of the memory barrier instruction is prevented until the buffer of the processor device is empty.
6. The method of any of the preceding items, wherein the memory coherence of the shared memory system is implemented using a coherence directory.
7. The method of item 6, wherein at least one of the first and the second flag information is provided by a message received by the processor device from the coherence directory.
8. The method of any of the items 6 or 7, wherein at least one of the first and the second flag information is provided by a message sent by the processor device to the coherence directory.
9. The method of any of the items 1 to 5, wherein the memory coherence of the shared memory system is implemented using broadcasting.
10. The method of any of the preceding items, wherein the instruction causing the processor device to fill the copy of the memory line to the processor cache memory is an instruction specifying a write access to the respective memory line.
11. The method of any of the preceding items, wherein the propagation of the memory coherence across the shared memory system comprises invalidating further copies of the memory line used by remote processor cache memories of further processor devices of the shared memory system.
12. The method of any of the preceding items, wherein messages relating to amendments of the content of the processor cache memory and processed by the processor device comprise a coherence propagation field, wherein the coherence propagation field comprises one of the following: flag information indicating that propagation of memory coherence across the shared memory system in respect of the amendment is unconfirmed, flag information indicating that propagation of memory coherence across the shared memory system in respect of the amendment is confirmed, or flag information indicating that neither a flagging nor an unflagging action is required.
13. A processor device of a coherent shared memory system, wherein the processor device is operatively connected with a processor cache memory and configured to coordinate an execution of an instruction sequence comprising a plurality of instructions, the coordinating comprising:
    executing an instruction of the instruction sequence, wherein the execution of the instruction causes the processor device to fill a copy of a memory line of a main memory of the shared memory system to the processor cache memory;
    upon detecting flag information indicating that propagation of memory coherence across the shared memory system in respect of the filling of the copy of the memory line is unconfirmed, flagging the respective memory line by the processor device;

upon detecting flag information indicating that the propagation of the memory coherence across the shared memory system in respect of the filling of the copy of the memory line is confirmed, unflagging the respective memory line by the processor device;

upon executing a memory barrier instruction of the instruction sequence, preventing a completion of execution of the memory barrier instruction while the memory line is flagged.

14. The processor device of item 13, wherein the completion of execution of the memory barrier instruction is prevented until all memory lines previously flagged by the processor device are unflagged.

15. The processor device of any of items 13 or 14, wherein the processor device comprises a buffer for registering memory lines of which copies are filled to the processor cache memory and for which propagation of memory coherence across the shared memory system in respect of the filling of the respective copies is unconfirmed, wherein the flagging of the memory line comprises adding an identifier of the memory line to the buffer of the processor device and wherein the unflagging of the flagged memory line comprises removing the identifier of the memory line from the buffer of the processor.

16. The processor device of item 15, wherein the identifier of the flagged memory line stored in the buffer comprises the memory address of the respective memory line in the main memory.

17. The processor device of any of items 15 or 16, wherein the completion of execution of the memory barrier instruction is prevented until the buffer of the processor device is empty.

18. A method for managing a coherence directory implementing memory coherence of a shared memory system, the method comprising:

maintaining by the coherence directory flag information assigned to a memory line of a main memory of the shared memory system, wherein a processor device of the shared memory system initiated a filling of a copy of the memory line to a processor cache memory operatively connected with the processor device, the flag information indicating whether propagation of memory coherence across the shared memory system in respect of the filling of the copy of the memory line is confirmed;

including the flag information into a message to be sent by the coherence directory to the processor device;

sending the message to the processor device by the coherence directory.

19. The method of item 18, wherein the coherence directory initiates the maintaining of the flag information assigned to the memory line upon determining that an amendment of the content of a remote processor cache memory of a further processor device of the shared memory system is required in order to propagate memory coherence in respect of the filling of the copy of the memory line to the remote cache memory.

20. The method of item 19, wherein the coherence directory sends a request to the remote processor cache memory requesting an amendment of the content of the remote processor cache memory in order to propagate the memory coherence in respect of the filling of the copy of the memory line to the remote processor cache memory.

21. The method of item 20, wherein the amendment requested by the coherence directory comprises an invalidation of a further copy of the memory line comprised by the remote processor cache memory.

22. The method of item 19, wherein the coherence directory comprises a register for keeping track of the amendments of contents of the processor cache memories of the further processor devices of the shared memory system due to the propagation of the memory coherence across the shared memory system in respect of the filling of the copy of the memory line.

23. The method of item 22, wherein the register comprises a coherence propagation notification indicator identifying processor cache memories of processor devices of the shared memory system which are to be notified by the coherence directory, when the propagation of the memory coherence across the shared memory system in respect of the filling of the copy of the memory line is confirmed.

24. A coherence directory implementing memory coherence of a shared memory system, the coherence directory being configured for:

maintaining flag information assigned to a memory line of a main memory of the shared memory system, wherein a processor device of the shared memory system initiated a filling of a copy of the memory line to a processor cache memory operatively connected with the processor device, the flag information indicating whether propagation of memory coherence across the shared memory system in respect of the filling of the copy of the memory line is confirmed;

including the flag information into a message;

sending the message to the processor device.

25. A coherent shared memory system comprising a coherence directory implementing memory coherence of the shared memory system, a main memory and a processor device operatively connected with a processor cache memory, the processor device being configured for coordinating an execution of an instruction sequence comprising a plurality of instructions, the coordinating comprising:

executing an instruction of the instruction sequence, wherein the execution of the instruction causes the processor device to fill a copy of a memory line of the main memory to the processor cache memory;

upon detecting flag information indicating that propagation of memory coherence across the shared memory system in respect of the filling of the copy of the memory line is unconfirmed, flagging the respective memory line by the processor device;

upon detecting flag information indicating that the propagation of the memory coherence across the shared memory system in respect of the filling of the copy of the memory line is confirmed, unflagging the respective memory line by the processor device;

upon executing a memory barrier instruction of the instruction sequence, preventing a completion of execution of the memory barrier instruction while the memory line is flagged;

and the coherence directory being configured for maintaining the flag information assigned to the memory line of the main memory upon determining an initiation of the filling of the copy of the memory line, the flag information indicating whether the propagation of the memory coherence across the shared memory system in respect of the filling of the copy of the memory line is confirmed, wherein the maintaining comprises:

initially including the flag information indicating that the propagation of memory coherence across the shared memory system in respect of the filling of the copy of the memory line is unconfirmed into a first message;

sending the first message to the processor device;

upon obtaining a confirmation of the propagation, updating the flag information and including the updated flag information indicating that the propagation of memory coherence across the shared memory system in respect of the filling of the copy of the memory line is confirmed into a second message;

sending the second message to the processor device.

The invention claimed is:

1. A method for coordinating an execution of an instruction sequence comprising a plurality of instructions by a processor device of a coherent shared memory system, wherein the processor device is operatively connected with a processor cache memory, the method comprising:

executing an instruction of the instruction sequence by the processor device, wherein the execution of the instruction causes the processor device to fill a copy of a memory line of a main memory of the shared memory system to the processor cache memory;

receiving, by the processor device from a controller included as part of a shared memory, a message including flag information indicating whether memory coherence propagation across the shared memory system is confirmed, wherein the controller maintains a directory table of memory line entries and a transient table;

upon detecting that the received flag information indicates that propagation of memory coherence across the shared memory system in respect of the filling of the copy of the memory line is unconfirmed, flagging the respective memory line by the processor device;

upon detecting that the received flag information indicates that the propagation of the memory coherence across the shared memory system in respect of the filling of the copy of the memory line is confirmed, unflagging the respective memory line by the processor device; and upon executing a memory barrier instruction of the instruction sequence, preventing by the processor device a completion of execution of the memory barrier instruction while the memory line is flagged.

2. The method of claim 1, wherein the completion of execution of the memory barrier instruction is prevented until all memory lines previously flagged by the processor device are unflagged.

3. The method of claim 1, wherein the flagging of the memory line comprises adding an identifier of the memory line to a buffer of the processor device and wherein the unflagging of the flagged memory line comprises removing the identifier of the memory line from the buffer of the processor.

4. The method of claim 3, wherein the identifier of the flagged memory line stored in the buffer comprises a memory address of the respective memory line in the main memory.

5. The method of claim 3, wherein the completion of execution of the memory barrier instruction is prevented until the buffer of the processor device is empty.

6. The method of claim 1, wherein the memory coherence of the shared memory system is implemented using a coherence directory.

7. The method of claim 6, wherein flag information is provided by a message sent by the processor device to the coherence directory.

8. The method of claim 1, wherein the memory coherence of the shared memory system is implemented using broadcasting.

9. The method of claim 1, wherein the instruction causing the processor device to fill the copy of the memory line to the processor cache memory is an instruction specifying a write access to the respective memory line.

10. The method of claim 1, wherein the propagation of the memory coherence across the shared memory system comprises invalidating further copies of the memory line used by remote processor cache memories of further processor devices of the shared memory system.

11. The method of claim 1, wherein messages relating to amendments of content of the processor cache memory and processed by the processor device comprise a coherence propagation field, wherein the coherence propagation field comprises one of the following: flag information indicating that propagation of memory coherence across the shared memory system in respect of the amendment is unconfirmed, flag information indicating that propagation of memory coherence across the shared memory system in respect of the amendment is confirmed, or flag information indicating that neither a flagging nor an unflagging action is required.

12. A processor device of a coherent shared memory system, wherein the processor device is operatively connected with a processor cache memory and configured to coordinate an execution of an instruction sequence comprising a plurality of instructions, the coordinating comprising:

executing an instruction of the instruction sequence, wherein the execution of the instruction causes the processor device to fill a copy of a memory line of a main memory of the shared memory system to the processor cache memory;

receiving, by the processor device from a controller included as part of a shared memory, a message including flag information indicating whether memory coherence propagation across the shared memory system is confirmed, wherein the controller maintains a directory table of memory line entries and a transient table;

upon detecting that the received flag information indicates that propagation of memory coherence across the shared memory system in respect of the filling of the copy of the memory line is unconfirmed, flagging the respective memory line by the processor device;

upon detecting that the received flag information indicates that the propagation of the memory coherence across the shared memory system in respect of the filling of the copy of the memory line is confirmed, unflagging the respective memory line by the processor device; and upon executing a memory barrier instruction of the instruction sequence, preventing a completion of execution of the memory barrier instruction while the memory line is flagged.

13. The processor device of claim 12, wherein the completion of execution of the memory barrier instruction is prevented until all memory lines previously flagged by the processor device are unflagged.

14. The processor device of claim 12, wherein the processor device comprises a buffer for registering memory lines of which copies are filled to the processor cache memory and for which propagation of memory coherence across the shared memory system in respect of the filling of the respective copies is unconfirmed, wherein the flagging of the memory line comprises adding an identifier of the memory line to the buffer of the processor device and wherein the unflagging of the flagged memory line comprises removing the identifier of the memory line from the buffer of the processor.

15. The processor device of claim 14, wherein the identifier of the flagged memory line stored in the buffer comprises a memory address of the respective memory line in the main memory.

16. The processor device of claim 14, wherein the completion of execution of the memory barrier instruction is prevented until the buffer of the processor device is empty.

17. A method for managing a coherence directory implementing memory coherence of a shared memory system, the method comprising:
  maintaining by the coherence directory flag information assigned to a memory line of a main memory of the shared memory system, wherein a processor device of the shared memory system initiated a filling of a copy of the memory line to a processor cache memory operatively connected with the processor device, the flag information indicating whether propagation of memory coherence across the shared memory system in respect of the filling of the copy of the memory line is confirmed, wherein the coherence directory comprises a directory table and a transient table;
  including the flag information into a message to be sent by the coherence directory to the processor device; and
  sending the message to the processor device by the coherence directory, wherein the processor device has filled the copy of the memory line to the processor cache memory.

18. The method of claim 17, wherein the coherence directory initiates the maintaining of the flag information assigned to the memory line upon determining that an amendment of content of a remote processor cache memory of a further processor device of the shared memory system is required in order to propagate memory coherence in respect of the filling of the copy of the memory line to the remote cache memory.

19. The method of claim 18, wherein the coherence directory sends a request to the remote processor cache memory requesting an amendment of the content of the remote processor cache memory in order to propagate the memory coherence in respect of the filling of the copy of the memory line to the remote processor cache memory.

20. The method of claim 19, wherein the amendment requested by the coherence directory comprises an invalidation of a further copy of the memory line comprised by the remote processor cache memory.

21. The method of claim 18, wherein the coherence directory comprises a register for keeping track of the amendments of contents of the processor cache memories of the further processor devices of the shared memory system due to the propagation of the memory coherence across the shared memory system in respect of the filling of the copy of the memory line.

22. The method of claim 21, wherein the register comprises a coherence propagation notification indicator identifying processor cache memories of processor devices of the shared memory system which are to be notified by the coherence directory, when the propagation of the memory coherence across the shared memory system in respect of the filling of the copy of the memory line is confirmed.

23. A coherence directory implementing memory coherence of a shared memory system, the coherence directory being configured for:
  maintaining flag information assigned to a memory line of a main memory of the shared memory system, wherein a processor device of the shared memory system initiated a filling of a copy of the memory line to a processor cache memory operatively connected with the processor device, the flag information indicating whether propagation of memory coherence across the shared memory system in respect of the filling of the copy of the memory line is confirmed, wherein the coherence directory comprises a directory table and a transient table;
  including the flag information into a message; and
  sending the message to the processor device, wherein the processor device has filled the copy of the memory line to the processor cache memory.

24. A coherent shared memory system comprising a coherence directory implementing memory coherence of the shared memory system, a main memory and a processor device operatively connected with a processor cache memory,
  the processor device being configured for coordinating an execution of an instruction sequence comprising a plurality of instructions, the coordinating comprising:
    executing an instruction of the instruction sequence, wherein the execution of the instruction causes the processor device to fill a copy of a memory line of the main memory to the processor cache memory;
    receiving, by the processor device from a controller included as part of a shared memory, a message including flag information indicating whether memory coherence propagation across the shared memory system is confirmed, wherein the controller maintains a directory table of memory line entries;
    upon detecting that the received flag information indicates that propagation of memory coherence across the shared memory system in respect of the filling of the copy of the memory line is unconfirmed, flagging the respective memory line by the processor device;
    upon detecting that the received flag information indicates that the propagation of the memory coherence across the shared memory system in respect of the filling of the copy of the memory line is confirmed, unflagging the respective memory line by the processor device; and
    upon executing a memory barrier instruction of the instruction sequence, preventing a completion of execution of the memory barrier instruction while the memory line is flagged;
  and the coherence directory being configured for maintaining the flag information assigned to the memory line of the main memory upon determining an initiation of the filling of the copy of the memory line, the flag information indicating whether the propagation of the memory coherence across the shared memory system in respect of the filling of the copy of the memory line is confirmed, wherein the coherence directory comprises a transient table, wherein the maintaining comprises:
    initially including the flag information indicating that the propagation of memory coherence across the shared memory system in respect of the filling of the copy of the memory line is unconfirmed into a first message;
    sending the first message to the processor device;
    upon obtaining a confirmation of the propagation, updating the flag information and including the updated flag information indicating that the propagation of memory coherence across the shared memory system in respect of the filling of the copy of the memory line is confirmed into a second message; and sending the second message to the processor device that filled the copy of the memory line to the processor cache memory.

* * * * *